(12) United States Patent
Kageyama

(10) Patent No.: US 9,211,906 B2
(45) Date of Patent: Dec. 15, 2015

(54) VEHICLE SUSPENSION DEVICE, AUTOMOBILE USING THE SAME, AND TURNING CONTROL METHOD

(71) Applicant: Nissan Motor Co., Ltd., Kanagawa (JP)

(72) Inventor: Yusuke Kageyama, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 14/413,781

(22) PCT Filed: Jun. 28, 2013

(86) PCT No.: PCT/JP2013/004048
§ 371 (c)(1),
(2) Date: Jan. 9, 2015

(87) PCT Pub. No.: WO2014/013682
PCT Pub. Date: Jan. 23, 2014

(65) Prior Publication Data
US 2015/0151778 A1    Jun. 4, 2015

(30) Foreign Application Priority Data
Jul. 20, 2012 (JP) .................................. 2012-161886

(51) Int. Cl.
*A01B 69/00* (2006.01)
*B62D 5/00* (2006.01)
(Continued)

(52) U.S. Cl.
CPC ........ *B62D 5/006* (2013.01); *B60G 3/20* (2013.01); *B62D 1/20* (2013.01); *B62D 5/0466* (2013.01);
(Continued)

(58) Field of Classification Search
CPC ........ B62D 5/006; B62D 1/20; B62D 5/0466; B62D 7/00; B62D 7/20; B60G 3/20; B60G 2200/144; B60G 2200/156; B60G 2200/18; B60G 2200/44; B60G 2200/46; B60G 2200/462; B60G 2200/464

USPC ........ 701/41; 280/124.179, 93.504; 180/337, 180/446

See application file for complete search history.

(56) References Cited

U.S. PATENT DOCUMENTS 2,671,298 A * 3/1954 Fergason ............... A01D 46/14
                                                    180/215
2,957,701 A * 10/1960 Rich ..................... B60G 21/045
                                                    267/273
(Continued)

FOREIGN PATENT DOCUMENTS

JP    H11-129926 A    5/1999
JP    2007/237840 A    9/2007
(Continued)

OTHER PUBLICATIONS

International Search Report issued in PCT/JP2013/004048 mailed on Sep. 24, 2013 (4 pages).

(Continued)

*Primary Examiner* — Helal A Algahaim
*Assistant Examiner* — Shardul Patel
(74) *Attorney, Agent, or Firm* — Osha Liang LLP

(57) ABSTRACT

A vehicle suspension device includes first lower link member and a second lower link member configured to individually couple a vehicle side support part and the axle carrier having an axle of rotatably supporting a turning wheel, a first upper link member and a second upper link member, and a component of moving a virtual lower pivot point represented by a cross point of the first lower link member and the second lower link member, in a planer view, toward an outer side and frontward in a vehicle width direction, when the turning wheel is turned from a straight travel state, and moving a virtual upper pivot point represented by a cross point of the first upper link member and the second upper link member at least toward the outer side and frontward in the vehicle width direction, when the turning wheel is turned from the straight travel state.

24 Claims, 18 Drawing Sheets

(51) Int. Cl.
*B60G 3/20* (2006.01)
*B62D 7/00* (2006.01)
*B62D 7/18* (2006.01)
*B62D 1/20* (2006.01)
*B62D 5/04* (2006.01)
*B62D 7/20* (2006.01)

(52) U.S. Cl.
CPC .. *B62D 7/00* (2013.01); *B62D 7/18* (2013.01); *B62D 7/20* (2013.01); *B60G 2200/144* (2013.01); *B60G 2200/156* (2013.01); *B60G 2200/18* (2013.01); *B60G 2200/44* (2013.01); *B60G 2200/46* (2013.01); *B60G 2200/462* (2013.01); *B60G 2200/464* (2013.01)

(56) References Cited

U.S. PATENT DOCUMENTS

| | | | | |
|---|---|---|---|---|
| 3,021,152 | A * | 2/1962 | Fiala | B60G 9/00 267/274 |
| 3,096,696 | A * | 7/1963 | Reisser | E01C 23/082 126/271.2 A |
| 3,338,327 | A * | 8/1967 | Bishop | B60K 5/00 180/349 |
| 2010/0133775 | A1 * | 6/2010 | Roland | B60G 3/26 280/124.179 |
| 2013/0245890 | A1 * | 9/2013 | Kageyama | B62D 7/18 701/41 |
| 2014/0014433 | A1 * | 1/2014 | Kageyama | B62D 7/18 180/402 |

FOREIGN PATENT DOCUMENTS

| | | |
|---|---|---|
| JP | 2008-018924 A | 1/2008 |
| JP | 2009-090762 A | 4/2009 |
| JP | 2010-508202 A | 3/2010 |
| JP | 2010-126014 A | 6/2010 |
| JP | 2011-173562 A | 9/2011 |
| WO | 2005/092644 A1 | 10/2005 |
| WO | 2009/062823 A1 | 5/2009 |
| WO | 2012/073469 A1 | 6/2012 |

OTHER PUBLICATIONS

Written Opinion of the International Searching Authority issued in PCT/JP2013/004048 mailed on Sep. 24, 2013 (5 pages).
International Preliminary Report on Patentability from PCT/JP2013/004048 issued on May 27, 2014 (24 pages).
English translation of International Preliminary Report on Patentability issued in PCT/JP2013/004048, mailed on Jan. 22, 2015 (5 pages).

* cited by examiner

CHANGE IN GROUNDING SURFACE CENTER TRAJECTORY

TRANSVERSAL COMPLIANCE STEER
(TRAIL)

TRANSVERSAL STIFFNESS
(GROUNDING POINT)

FRONT-REAR COMPLIANCE STEER
(GROUNDING POINT)

VEHICLE SUSPENSION DEVICE, AUTOMOBILE USING THE SAME, AND TURNING CONTROL METHOD

BACKGROUND

1. Technical Field

The present disclosure relates to a vehicle suspension device for suspending a vehicle body, an automobile using the same, and a turning control method.

2. Related Art

In a vehicle suspension device, in one technology, an intended suspension performance is achieved by settings of a kingpin axis.

For example, in one technology as described in PLT 1, an upper arm and a lower arm each including two letter I-shaped arms, at an upper side and a lower side of an axle of an axle carrier, are supported by an identical single point to configure a link arrangement of suppressing the movement in a vehicle front-rear direction in the turning at an upper or lower pivot point of the kingpin, so as to improve steerability and stability.

In addition, for example, in another technology as described in PLT 2, a lower transverse link including two arms crossing each other and an upper transverse link supporting two arms with a common link bearing are provided on a lower side and an upper side of the axle of the axle carrier, respectively. The kingpin axis that couples a virtual lower pivot point represented by a cross point of the two arms of the lower transverse link and an upper pivot point represented by the center of a link bearing of the upper transverse link virtually extends at a negative angle, so that the grounding point with the road surface is in the inside in the vehicle width direction of the turning wheel.

CITATION LIST

Patent Literature

PLT 1: JP 2010-126014 A
PLT 2: WO 2009/062823

SUMMARY

When the turning is made while the vehicle is traveling, however, a transversal force depending on the travel speed is input at the tire grounding point, but the influence of the transversal force is not considered in the technology as described in PLT 1. Besides, when braking is performed in the turning, the force in the vehicle front-rear direction (i.e., rearward force) is exerted onto the wheel, in addition to the transversal force. A change in the link influenced by the front-rear force is to be considered.

In the technology as described in PLT 2, however, when the lower transverse link includes two arms, a cross link structure in which the two arms cross each other is configured so that the cross point can be the virtual pivot point. In this situation, generally, the scrub radius becomes larger, whereas the kingpin slanted angle becomes smaller. Hence, the rack axial force in the turning can be reduced.

However, as the virtual pivot point of the lower link is changed sequentially by the turning, it becomes difficult to obtain an intended scrub radius or kingpin slanted angle in the turning. In the technology as described in PLT 2, in particular, when viewed from the vehicle front side, the kingpin axis has the kingpin slanted angle in which the kingpin axis passes through an inner end part in the vehicle width direction of the turning wheel on the upper side, whereas the kingpin axis is in the inside in the vehicle width direction of the turning wheel on the lower side. Thus, in the turning of the turning wheel, a tire grounding area is small and the stable limit of the vehicle is low.

However, as the virtual pivot point of the lower link is changed sequentially by the turning, it becomes difficult to obtain an intended scrub radius or kingpin slanted angle in the turning.

One or more embodiments of the present disclosure suppresses a change in the scrub radius or kingpin slanted angle, in the turning of the lower arm having a crosslink structure, in the vehicle suspension device.

According to one or more embodiments of the present disclosure, there is provided a vehicle suspension device, comprising: an axle carrier having an axle of rotatably supporting a turning wheel; a first lower link member and a second lower link member configured to individually couple a vehicle side support part and the axle carrier, on a lower side of the axle; and a first upper link member and a second upper link member configured to individually couple the vehicle side support part and the axle carrier, on an upper side of the axle, wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward in the planer view, when the turning wheel is turned from a straight travel state, and wherein the first upper link member and the second upper forms an upper link structure having a component moving a virtual upper pivot point represented by a cross point of the first upper link member and the second upper link member, in the plane view, at least toward the outer side and frontward in the vehicle width direction, when the turning wheel is turned from the straight travel state.

In one embodiment of the present disclosure, in the lower link structure, the first lower link member and the second lower link member are configured to cross each other, and the cross point of the first lower link member and the second lower link member forms a virtual lower pivot point. The virtual lower pivot point moves to the outer side in the vehicle width direction in the turning of the wheel. Therefore, the upper link structure is configured to include the first upper link member and the second upper link member, and includes a component of moving the virtual upper pivot point to at least outer side in the vehicle width direction in the turning. It is possible to suppress a change in the scrub radius and the kingpin slanted angle.

DETAILED DESCRIPTION

Hereinafter, embodiments of the present disclosure that are applied to an automobile will be described with reference to drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(First Embodiment)
(Configuration)

Figure 1:
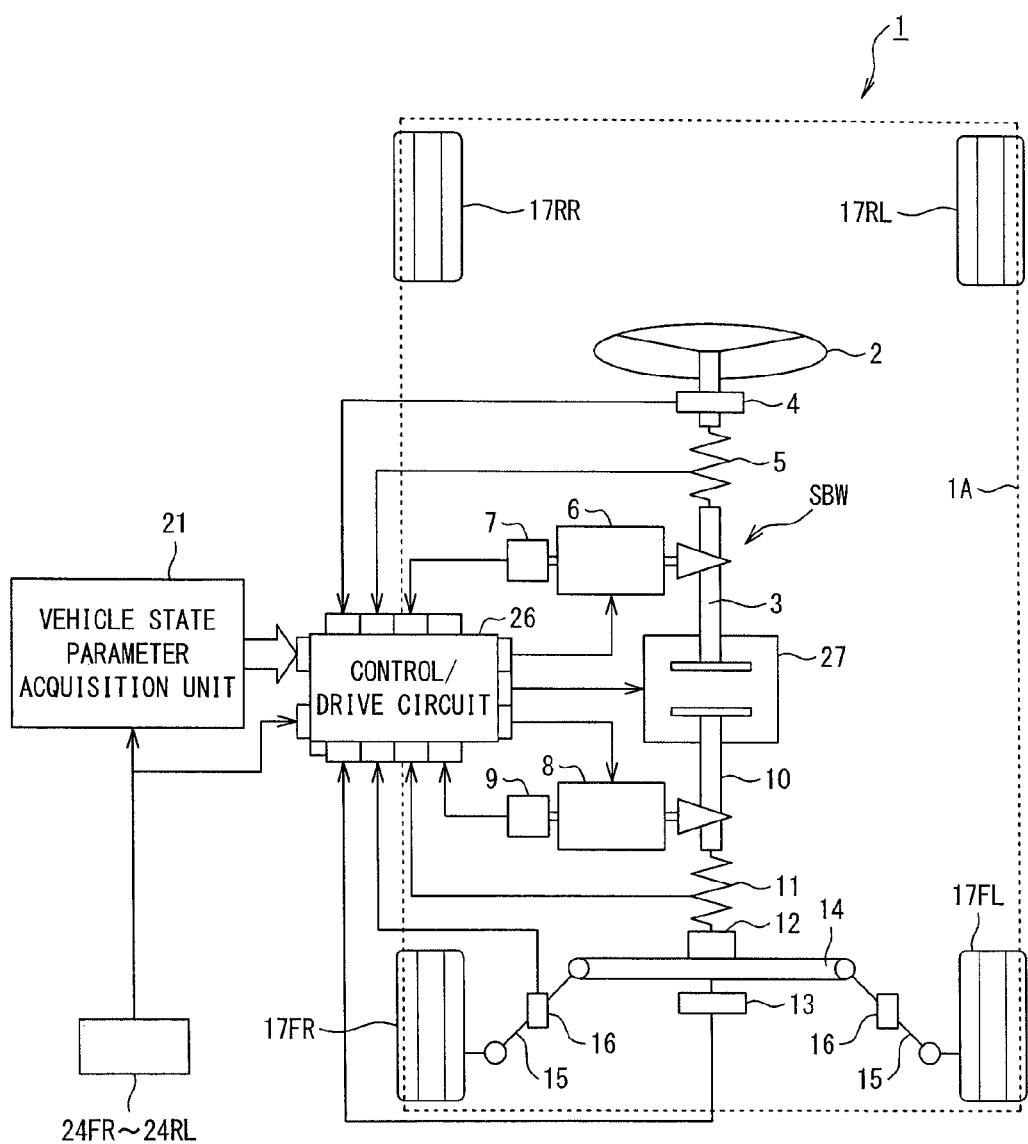
FIG. 1 is a schematic view illustrative of a configuration of an automobile 1 in a first embodiment.

FIG. 1 is a schematic view illustrative of a configuration of an automobile 1 in a first embodiment of the present disclosure.

In FIG. 1, an automobile 1 includes a vehicle body 1A, a steering wheel 2, an input side steering shaft 3, a steering angle sensor 4, a steering torque sensor 5, a steering reaction force actuator 6, a steering reaction force actuator angle sensor 7, a turning actuator 8, a turning actuator angle sensor 9, an output side steering shaft 10, a turning torque sensor 11, a pinion gear 12, a pinion angle sensor 13, a steering rack member 14, a tie rod 15, a tie rod axial force sensor 16, wheels 17FR, 17FL, 17RR, and 17RL, a vehicle state parameter acquisition unit 21, wheel speed sensors 24FR, 24FL, 24RR, and 24RL, a control/drive circuit unit 26, and a mechanical backup 27.

The steering wheel 2 is configured to rotate integrally with the input side steering shaft 3, and to transmit a steering input by a driver to the input side steering shaft 3.

The input side steering shaft 3 includes the steering reaction force actuator 6, and is configured to add a steering reaction force of the steering reaction force actuator 6 to the steering input that has been input from the steering wheel 2.

The steering angle sensor 4 is included in the input side steering shaft 3, and is configured to detect a rotation angle (that is, a steering input angle input by the driver to the steering wheel 2) of the input side steering shaft 3. The steering angle sensor 4 is configured to output the detected rotation angle of the input side steering shaft 3 to the control/drive circuit unit 26.

The steering torque sensor 5 is arranged at the input side steering shaft 3, and is configured to detect the rotation torque (that is, a steering input torque to be input to the steering wheel 2) of the input side steering shaft 3. Then, the steering torque sensor 5 is configured to output the detected rotation torque of the input side steering shaft 3 to the control/drive circuit unit 26.

The steering reaction force actuator 6 has a gear, rotating integrally with the motor shaft, that meshes with a gear provided at a part of the input side steering shaft 3, and is configured to apply a reaction force to the rotation of the input side steering shaft 3 made by the steering wheel 2 according to an instruction from the control/drive circuit unit 26.

The steering reaction force actuator angle sensor 7 is configured to detect a rotation angle of the steering reaction force actuator 6 (that is, a rotation angle by the steering input that has been transmitted to the steering reaction force actuator 6), and to output the detected rotation angle to the control/drive circuit unit 26.

The turning actuator 8 has a gear, rotating integrally with the motor shaft, meshing with a gear provided at a part of the output side steering shaft 10, and is configured to rotate the output side steering shaft 10 according to an instruction from the control/drive circuit unit 26.

The turning actuator angle sensor 9 is configured to detect a rotation angle of the turning actuator 8 (that is, a rotation angle for the turning that has been output from the turning actuator 8), and to output the detected rotation angle to the control/drive circuit unit 26.

The output side steering shaft 10 includes the turning actuator 8, and is configured to transmit the rotation input by the turning actuator 8 to the pinion gear 12.

The turning torque sensor 11 is arranged at the output side steering shaft 10, and is configured to detect the rotation torque of the output side steering shaft 10 (that is, the turning torque of the wheels 17FR and 17FL via the steering rack member 14). Then, the turning torque sensor 11 is configured to output the detected rotation torque of the output side steering shaft 10 to the control/drive circuit unit 26.

The pinion gear 12 meshes with a flat tooth formed at the steering rack member 14, and is configured to transmit the rotation that has been input from the output side steering shaft 10 to the steering rack member 14.

The pinion angle sensor 13 is configured to detect a rotation angle of the pinion gear 12 (that is, the turning angle of the wheels 17FR and 17FL output via the steering rack member 14), and is configured to output the detected rotation angle of the pinion gear 12 to the control/drive circuit unit 26.

The steering rack member 14 has a rack that meshes with the pinion gear 12, and is configured to convert the rotation of the pinion gear 12 into a linear motion in the vehicle width direction. In one embodiment of the present disclosure, the steering rack member 14 is located closer to the vehicle front side than to the axles of the front wheels.

The tie rod 15 couples both ends of the steering rack member 14 and knuckle arms of the wheels 17FR and 17FL via ball joints, respectively.

The tie rod axial force sensors 16 are arranged at the tie rods 15 respectively provided at the both ends of the steering rack member 14, and to detect the axial forces being exerted on the tie rods 15. Then, the tie rod axial force sensors 16 are configured to output the detected axial forces of the tie rods 15 to the control/drive circuit unit 26.

The wheels 17FR, 17FL, 17RR, and 17RL are each configured by attaching a tire to a tire wheel, and are provided in a vehicle body 1A through the suspension device 1B. The front wheels (i.e., the wheels 17FR and 17FL) of these wheels, are configured to change the directions of the wheels 17FR and 17FL with respect to the vehicle body 1A when the knuckle arms are swung by the tie rods 15.

The vehicle state parameter acquisition unit 21 is configured to acquire a vehicle speed based on pulse signals representing the wheel rotation rates of the wheels output from the wheel speed sensors 24FR, 24FL, 24RR, and 24RL. In addition, the vehicle state parameter acquisition unit 21 is configured to acquire a slip rate of each wheel based on the vehicle speed and the wheel rotation rate of each wheel. Then, the vehicle state parameter acquisition unit 21 is configured to output each of the acquired parameters to the control/drive circuit unit 26.

The wheel speed sensors 24FR, 24FL, 24RR, and 24RL are configured to output the pulse signals representing the wheel rotation rate of each wheel to the vehicle state parameter acquisition unit 21 and the control/drive circuit unit 26.

The control/drive circuit unit 26 is configured to control the whole automobile 1, and to output various control signals to the steering reaction force actuator 6, the turning actuator 8, or the mechanical backup 27, based on the signals input from the sensors arranged at each part, as to the steering reaction force of the input side steering shaft 3, the turning angles of the front wheels, or coupling of the mechanical backup 27.

Further, the control/drive circuit unit 26 is configured to convert the detected values by each of the sensors into values for an intended use. For example, the control/drive circuit unit 26 is configured to convert the rotation angle that has been detected by the steering reaction force actuator angle sensor 7 into the steering input angle, convert the rotation angle that has been detected by the turning actuator angle sensor 9 into the turning angle of the wheel, or convert the rotation angle of the pinion gear 12 that has been detected by the pinion angle sensor 13 into the turning angle of the wheel.

It is to be noted that the control/drive circuit unit 26 is configured to monitor the rotation angle of the input side steering shaft 3 that has been detected by the steering angle sensor 4, the rotation angle of the steering reaction force actuator 6 that has been detected by the steering reaction force actuator angle sensor 7, the rotation angle of the turning actuator 8 that has been detected by the turning actuator angle sensor 9, and the rotation angle of the pinion gear 12 that has been detected by the pinion angle sensor 13. Based on a relationship among these rotation angles, the control/drive circuit unit 26 is capable of detecting an occurrence of a failure in the steering system. When detecting a failure in the steering system, the control/drive circuit unit 26 is configured to output to the mechanical backup 27 an instruction signal for coupling the input side steering shaft 3 and the output side steering shaft 10.

The mechanical backup 27 is a mechanism for ensuring transmission of the force from the input side steering shaft 3 to the output side steering shaft 10, by coupling the input side steering shaft 3 and the output side steering shaft 10 according to the instruction from the control/drive circuit unit 26.

In a general situation, to the mechanical backup 27, the control/drive circuit unit 26 gives an instruction of a state where the input side steering shaft 3 and the output side steering shaft 10 are not coupled.

By the occurrence of the failure in the steering system, when there is a demand for performing the steering operation without the intervention of the steering angle sensor 4, the steering torque sensor 5, or the turning actuator 8, an instruction of coupling the input side steering shaft 3 and the output side steering shaft 10 is input.

It is to be noted that, for example, the mechanical backup 27 can be configured with a cable type steering mechanism or the like.

Figure 2:
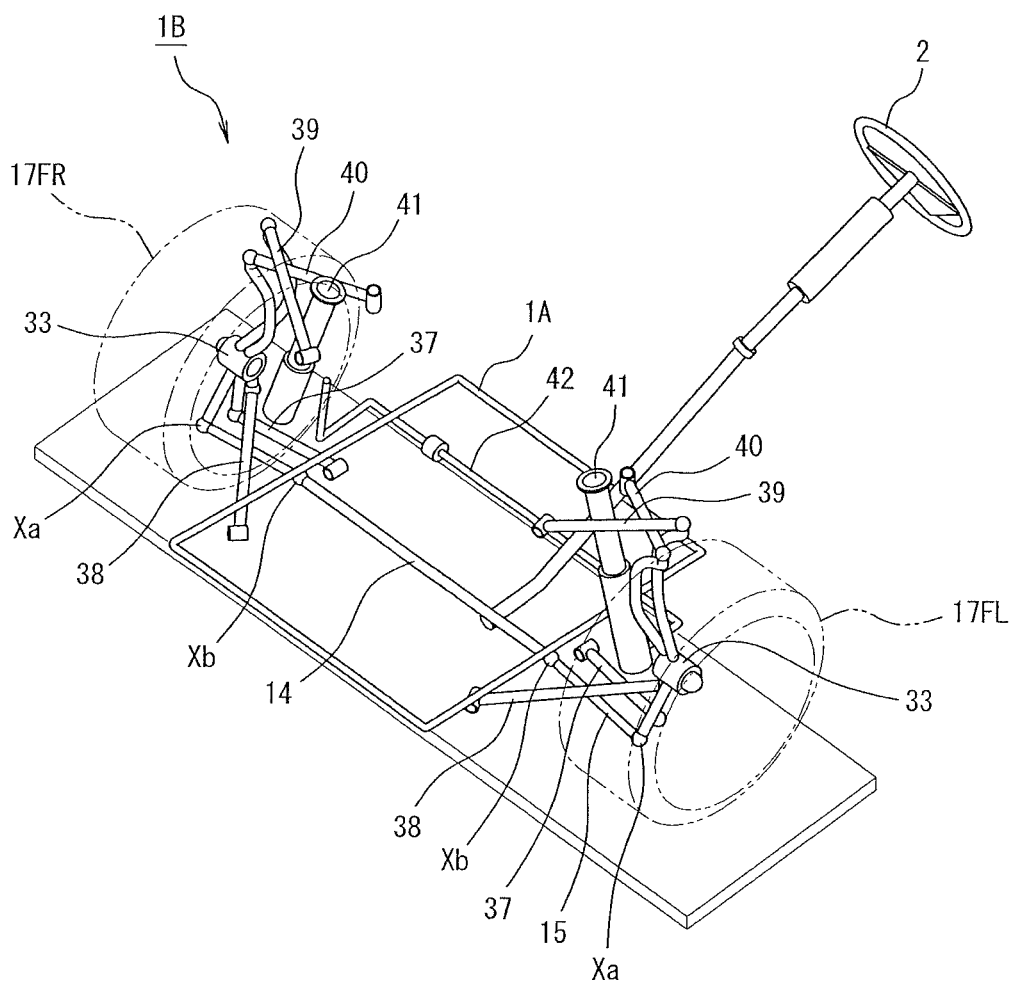
FIG. 2 is a perspective view schematically illustrative of a configuration of a suspension device 1B.
Figure 3:
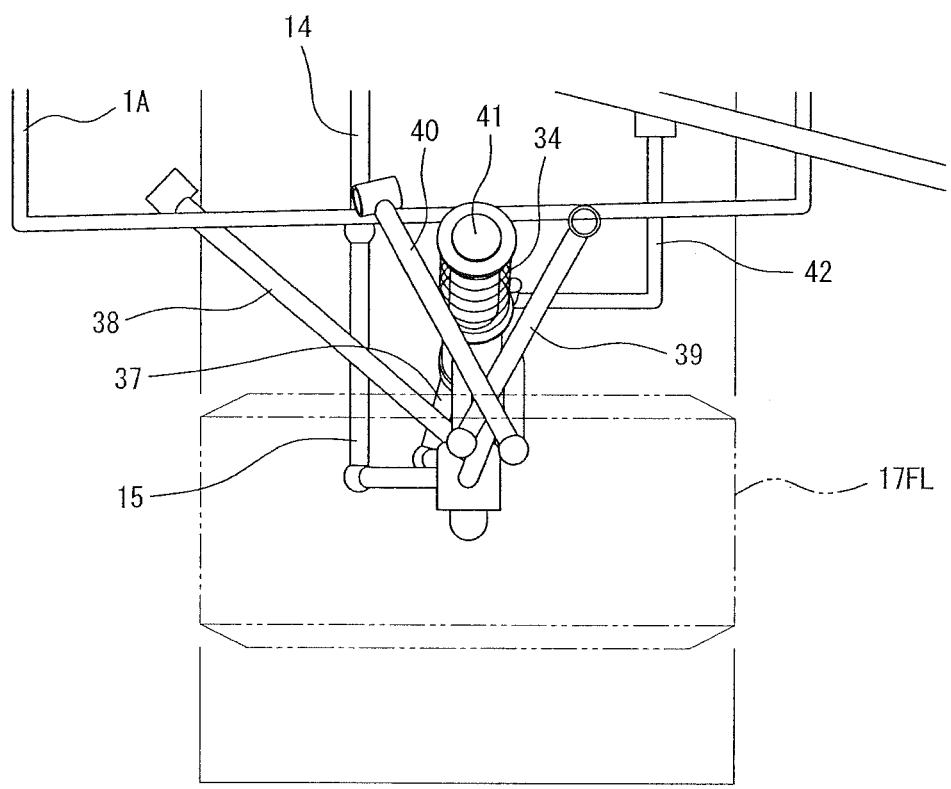
FIG. 3 is a planer view schematically illustrative of the configuration of the suspension device 1B.
Figure 4:
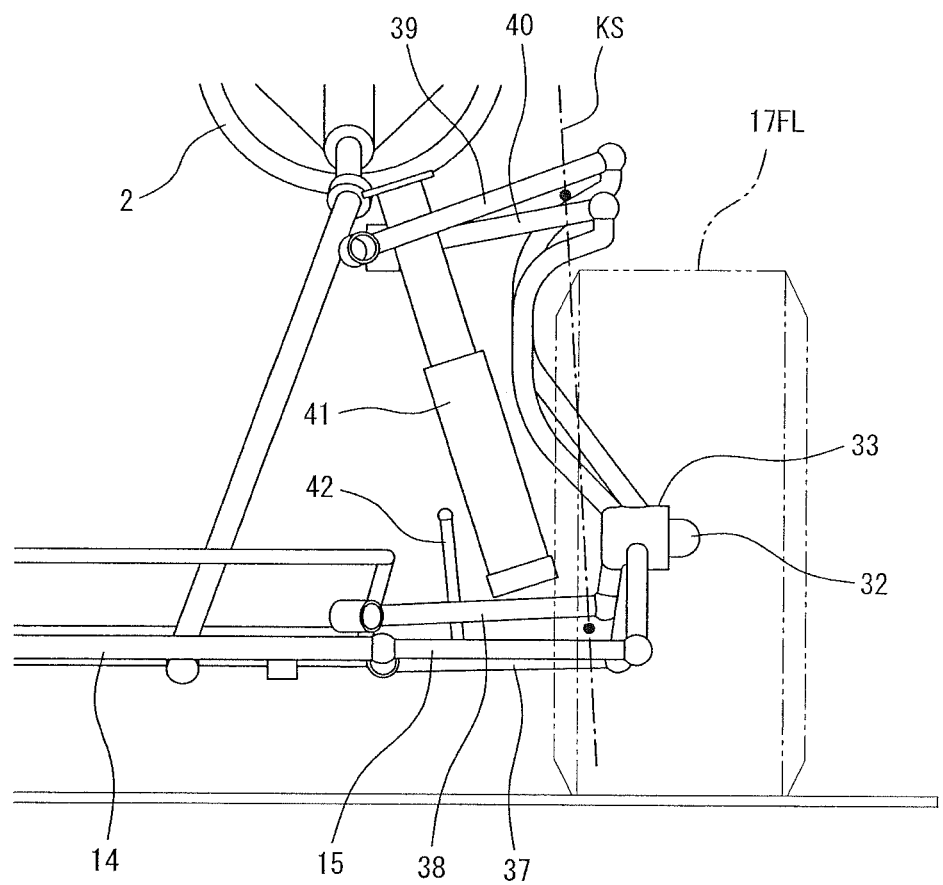
FIG. 4 is a front view schematically illustrative of the configuration of the suspension device 1B.
Figure 5:
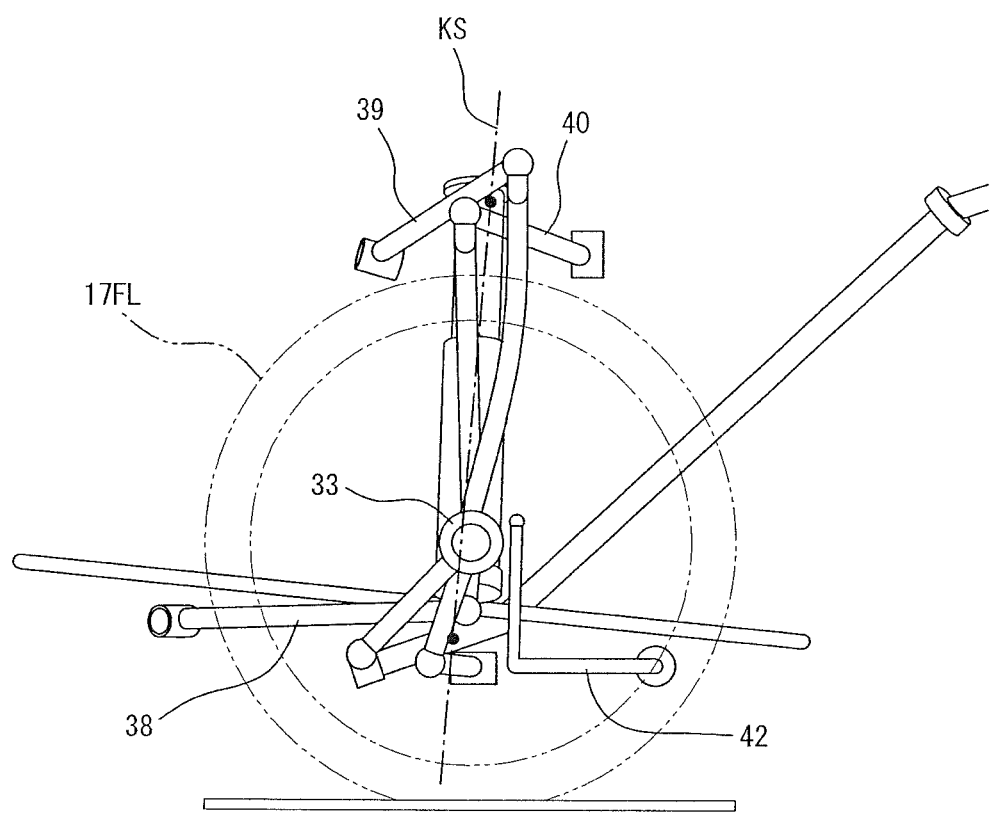
FIG. 5 is a side view schematically illustrative of the configuration of the suspension device 1B.
Figure 6A:
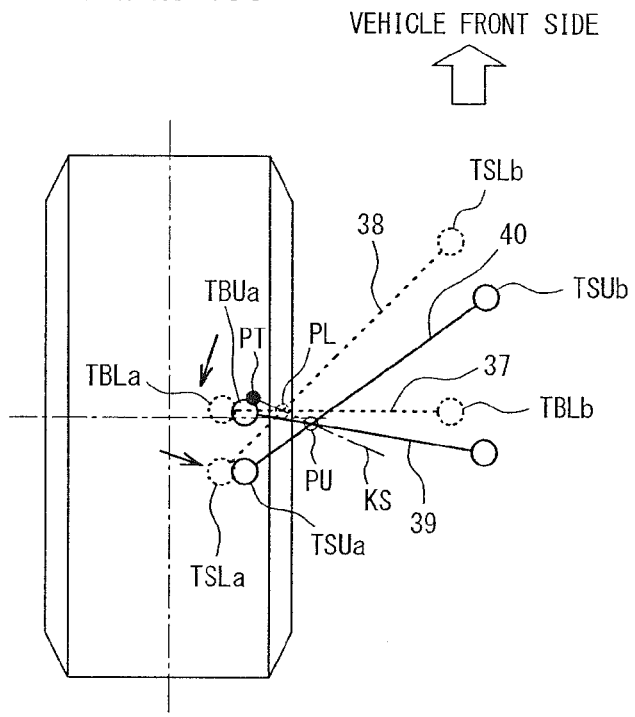
FIG. 6A is a partial planer view (i.e., left front wheel) schematically illustrative of a lower link structure of the suspension device 1B.
Figure 6B:
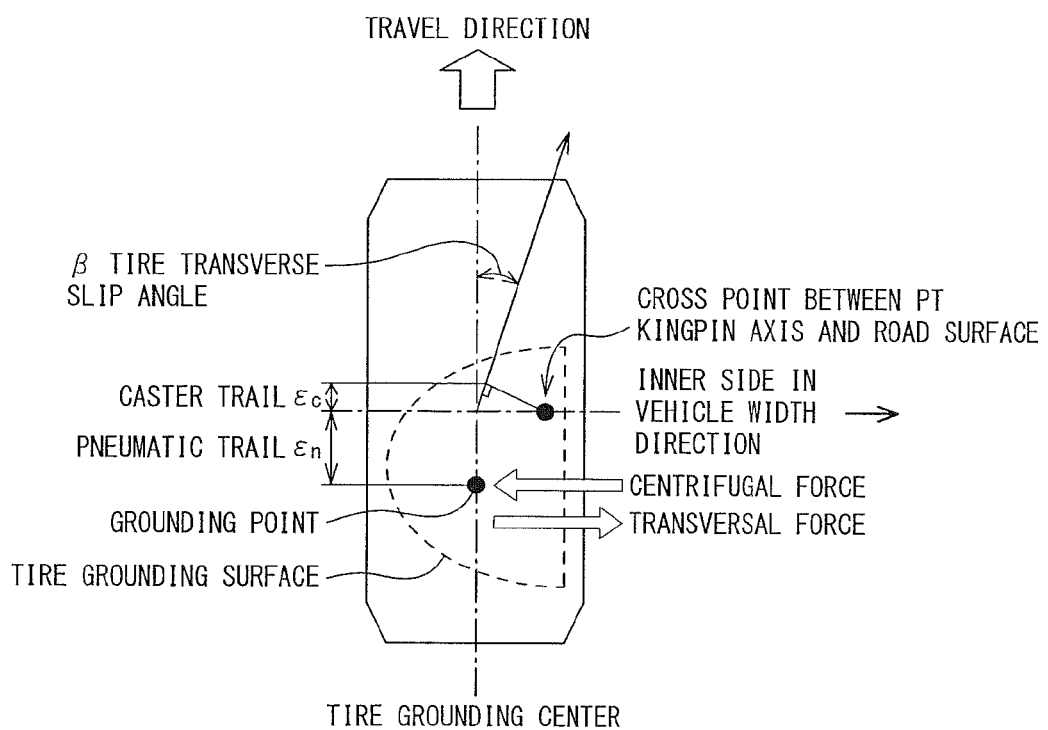
FIG. 6B is a view schematically illustrative of a tire grounding surface (i.e., right front wheel) of the lower link structure of the suspension device 1B.

FIG. 2 is a perspective view schematically illustrative of a configuration of a suspension device 1B in the first embodiment of the present disclosure. FIG. 3 is a planer view schematically illustrative of the configuration of the suspension device 1B of FIG. 2. FIG. 4 is a front view schematically illustrative of the configuration of the suspension device 1B of FIG. 2. FIG. 5 is a side view schematically illustrative of the configuration of the suspension device 1B of FIG. 2. FIG. 6A is a partial planer view (i.e., left front wheel) schematically illustrative of a lower link structure of the suspension device 1B of FIG. 2. FIG. 6B is a view schematically illustrative of a tire grounding surface (i.e., right front wheel) of the lower link structure of the suspension device 1B of FIG. 2.

As illustrated in FIG. 2 to FIG. 6B, the suspension device 1B is a suspension device of suspending the wheels 17FR and 17FL attached to a wheel hub mechanism WH, and includes axle carriers 33 having axle shafts (i.e., axles) 32 rotatably supporting the wheels 17FR and 17FL, plural link members arranged from a support part on the vehicle body side in the vehicle width direction to be coupled with the axle carrier 33, and spring members 34 such as coil springs or the like.

The plural link members are configured with a lower link structure including a transverse link (i.e., a transverse link member) 37 as a first lower link member and a tension link (i.e., a tension link member) 38 as a second lower link member, an upper link structure including a transverse link (i.e., a transverse link member) 39 as a first upper link member and a tension link (i.e., a tension link member) 40 as a second upper link member, the tie rod (i.e., a tie rod member) 15, a strut (i.e., the spring member 34 and a shock absorber 41), and a stabilizer 42.

The transverse link 37 and the tension link 38 forming the lower link structure couple the support part on the vehicle body side located lower than the axle 32 and the lower end of the axle carrier 33. In one embodiment of the present disclosure, the transverse link 37 and the tension link 38 are each letter I-shaped arms of separate members, respectively. Each of the transverse links 37 and the tension link 38 is coupled with the vehicle body at a single support part, and to be coupled with the axle carrier 33 at a single attachment part. Further, the vehicle body 1A and the axle carrier 33 are coupled with the transverse link 37 and the tension link 38 with crossing each other, in one embodiment of the present disclosure (hereinafter, the cross point of a virtual link configured with the transverse link 37 and the tension link 38 will be referred to as "virtual lower pivot point PL", accordingly).

In the above-described lower link structure, the transverse link 37 is arranged in substantially parallel to the axle, and in a vehicle planer view, a wheel side support point TBa of the transverse link 37 is arranged on the front side in the vehicle front-rear direction with respect to the wheel center (i.e., the axle). In addition, the tension link 38 is provided on a slant to the axle more than a slant of the transverse link 37 (i.e., in a direction such that the wheel side support point is arranged on the rear side and the vehicle body side support point is arranged on the front side). The wheel side support point TSa of the tension link 38 is arranged on the rear side in the vehicle front-rear direction with respect to the wheel center. Further, a vehicle body side support point TBb of the transverse link 37 is arranged on the front side in the vehicle front-rear direction with respect to the wheel side support point TSa of the tension link 38. Furthermore, a vehicle body side support point TSb of the tension link 38 is arranged on the front side in the vehicle front-rear direction with respect to the wheel side support point TBa of the transverse link 37.

In such a link arrangement, the transversal force input to the wheel is made receivable mainly by the transverse link 37. Also, in the above link arrangement, the vehicle body side support point TBLb of the transverse link 37 is arranged on the front side in the vehicle front-rear direction with respect to the wheel center.

The reasons for such a link arrangement are as follows.

In the turning, when a centrifugal force toward the turning outer side of the vehicle body is applied onto the tire grounding center point (i.e., a point of application of force), the transversal force toward the turning center is generated to resist the centrifugal force. When this transversal force (i.e., a force to the inner side of the vehicle) is input, the wheel side support point TBLa of the transverse link 37 moves toward the inner side of the vehicle, whereas the wheel side support point TSLa of the tension link 38 moves toward the outer side of the vehicle. Thus, for the transversal force to be input, the compliance steer of turning the wheel to the toe-in direction is achievable. In other words, the compliance steer in the vehicle transversal direction can be ensured.

The tie rod 15 is arranged on the lower side of the axle 32 to couple the steering rack member 14 and the axle carrier 33. The steering rack member 14 is configured to transmit the rotational force (i.e., steering force) that has been input from the steering wheel 2 to generate an axial force for the turning. Thus, the axial force in the vehicle width direction is applied on the axle carrier 33 by the tie rod 15, according to the rotation of the steering wheels 2, so as to turn the wheels 17FR and 17FL via the axle carrier 33.

In the lower link structure of the suspension device 1B in one embodiment of the present disclosure, in a vehicle planer view, a support point Xa on the wheel side of the tie rod 15 (i.e., on the axle carrier 33 side) is arranged on the inner side in the vehicle width direction with respect to the wheel side support points TBa and TSa of the transverse link 37 and the tension link 38. In addition, a vehicle body side support point Xb (i.e., a ball joint position to be a coupling part with an end of the steering rack member 14) of the tie rod 15 is, as illustrated in FIG. 2, arranged on the rear side in the vehicle front-rear direction with respect to the wheel side support point Xa.

It is to be noted that as described above, the wheel side support point TSLa of the tension link 38 is arranged on the rear side in the vehicle front-rear direction with respect to the wheel center, whereas the wheel side support point TBLa of the transverse link 37 is arranged on the front side the in the vehicle front-rear direction with respect to the wheel center. Further, the vehicle body side support point TBLa of the transverse link 37 is arranged on the front side in the vehicle front-rear direction with respect to the wheel side support point TSLa of the tension link 38, whereas the vehicle body side support point TSb of the tension link 38 is arranged on the front side in the vehicle front-rear direction with respect to the wheel side support point TBLa of the transverse link 37.

In such a link arrangement, in a situation where the force of the vehicle front-rear direction is dominant (i.e., in the turning brake of performing comparatively strong brake, or the like), the wheel side support point Xa of the tie rod 15 rotates around the vehicle body side support point Xb and moves toward the vehicle outer side, whereas the wheel side support point TSa of the tension link 38 moves toward the vehicle inner side, in response to the force in the vehicle front-rear direction (i.e., the force toward the vehicle rear side) that has been input at the tire grounding point. Further, the wheel side support point TBLa of the transverse link 37 moves toward the vehicle outer side. Therefore, the compliance steer of turning the wheel in the toe-out direction is achievable. That is, the compliance steer in the vehicle front-rear direction can be ensured.

In one embodiment of the present disclosure, as illustrated in FIG. 6B, the kingpin axis of the suspension device 1B is configured such that the grounding point with the road surface of the kingpin axis is arranged in the tire grounding surface, with the steering wheel 2 being located at the neutral position. In addition, a caster trail is configured to be located in the tire grounding surface. More specifically, in the suspension device 1B in one embodiment of the present disclosure, the caster angle is set to a value closer to zero, and the kingpin axis is set such that the caster trail comes closer to zero. Hence, tire twist torque in the turning can be reduced, and the moment around the kingpin axis can be made smaller. Moreover, the scrub radius is set to be a positive scrub equal to or larger than zero. Accordingly, as the caster trail for the scrub radius is generated as to a tire sideslip angle in the turning, the straight travel performance can be ensured.

Also, in one embodiment of the present disclosure, the transverse link 37 and the tension link 38 configuring the lower link structure couple the vehicle body 1A and the lower end of the axle carrier 33, with crossing each other. Therefore, as compared to the structure in which the transverse link 37 and the tension link 38 do not cross each other, the initial kingpin slanted angle can be lowered, and in addition, the initial scrub radius can be increased on the positive scrub side. For this reason, the tire twist torque in the turning can be lowered, and the rack axial force demanded for the turning can be reduced. Further, in one embodiment of the present disclosure, since the virtual lower pivot point PL is moved toward the vehicle body outer side by the transversal force being exerted on the wheel in the turning, the turning response performance can be improved.

(Details of Configuration Example)

Figure 7A:
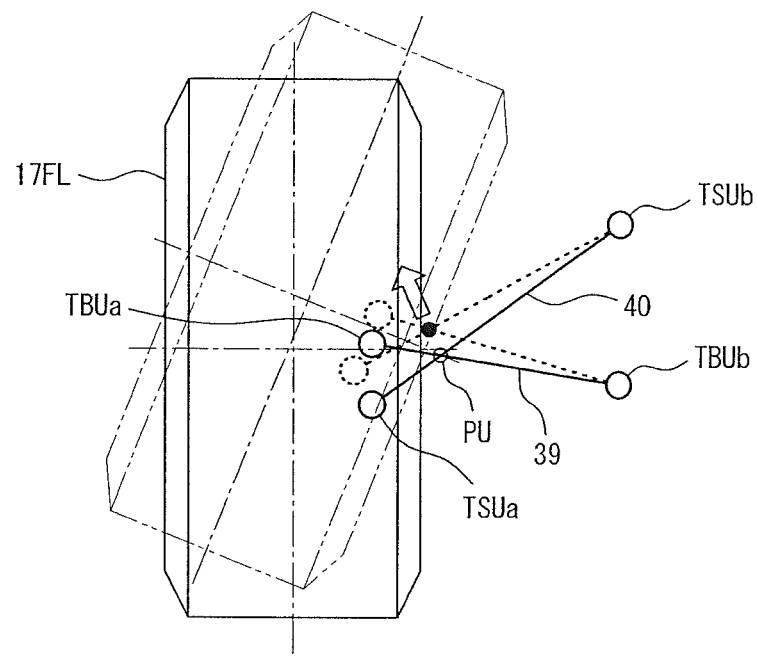
FIG. 7A is a view schematically illustrative of an upper link structure of the suspension device 1B.
Figure 7B:
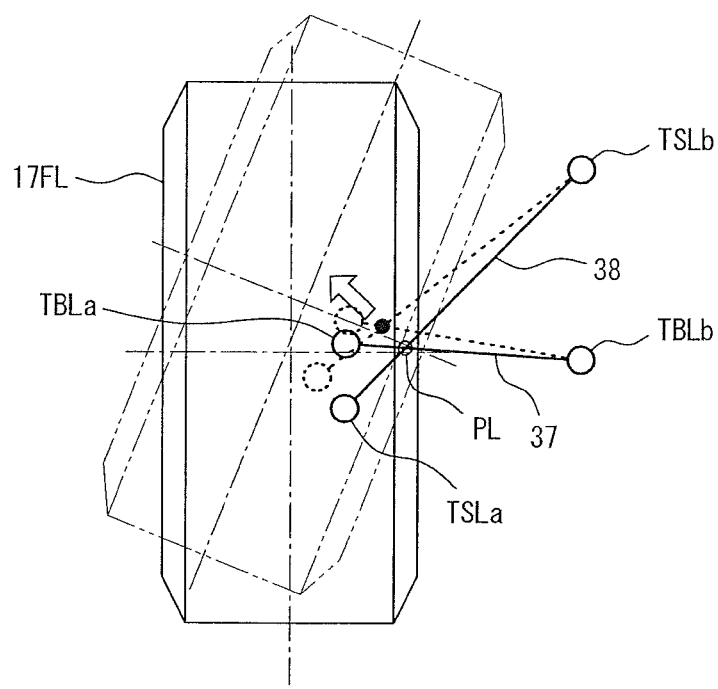
FIG. 7B is a view schematically illustrative of the lower link structure of the suspension device 1B.

FIG. 7A and FIG. 7B are schematic views illustrative of an example in which the upper link structure and the lower link structure of the suspension device 1B, in some embodiments of the present disclosure, are both configured with tension types. FIG. 7A illustrates the upper link structure, and FIG. 7B illustrates the lower link structure.

The lower link structure of the suspension device 1B is configured as a tension type as illustrated in FIG. 7B.

In a suspension device of tension type, in a case of a double pivot system in which the lower link members are made to cross each other, each of the lower link members rotates frontward the vehicle with centering around the vehicle body side support point so as to enable the turning as a turning outer wheel (i.e., a state indicated by dashed lines). In this situation, the virtual lower pivot point PL is a cross point where the lower link members cross each other. However, as the virtual lower pivot point PL can be located on the inner side in the vehicle width direction than the case of the suspension type where the lower link members do not cross each other, the initial scrub radius can be made large in the positive scrub direction.

In the lower link structure of the tension type illustrated in FIG. 7B, the rotation angle of the tension link 38 in the turning is large. Accordingly, the virtual lower pivot point PL moves toward the outer side of the vehicle body. In this case, in a vehicle planer view, when focusing on the distance from the tire center line in the tire front-rear direction to the virtual lower pivot point, a virtual upper pivot point PU is substantially fixed in a planer view, in a case where the upper link is configured with a letter A-shaped arm, for example. For this reason, when the virtual lower pivot point PL moves toward the outer side in the vehicle width direction than the tire center line, the scrub radius becomes smaller within the range of the positive scrub.

Thus, when one embodiment of the present disclosure is applied in the suspension device in which the lower link structure is configured to be a tension type, the scrub radius becomes smaller within the range of the positive scrub and hence the rack axial force becomes large, by making the turning as the turning outer wheel. However, while the turning is not being made, that is, while the vehicle is travelling straight, the initial scrub radius is largely taken. Therefore, the rack axial force value can be set smaller than that of the suspension device of the tension type in which the lower link members do not cross each other.

Incidentally, in the case of the suspension device of the tension type where the lower link members do not cross each other, the rotation angle of the tension link in the turning is large. Thus, the virtual lower pivot point moves toward the inner side of the vehicle body. In this case, in a vehicle planer view, since the distance from the tire center line in the tire front-rear direction to the virtual pivot point is located on the inner side of the vehicle body than the tire center line, the scrub radius is larger in the positive scrub direction. Accordingly, the rack axial force is made smaller by making the turning. However, as the virtual lower pivot point is located on an extension line of each link, the scrub radius in an initial state where the turning is not being made is small and it is hard to lead to a drastic reduction of the rack axial force.

On the other hand, the transverse link (i.e., a transverse link member) 39, as a first upper link member, and the tension link (i.e., a tension link member) 40, as a second upper link member, configuring the upper link structure, as illustrated in FIG. 4 and FIG. 5, couple the vehicle body side support part arranged above the axle 32 and an upper end of the axle carrier 33.

In one embodiment of the present disclosure, the transverse link 39 and the tension link 40 are the letter I-shaped members that are separated from each other. Each of the transverse links 39 and the tension link 40 is configured to be coupled with the vehicle body side at a single support part, and to be coupled with the axle carrier 33 side at a single attachment part.

Further, the vehicle body 1A and the axle carrier 33 are coupled by the transverse link 39 and the tension link 40, in one embodiment of the present disclosure, in a crossing state with each other (hereinafter, the cross point of the virtual link formed with the transverse link 39 and the tension link 40 will be referred to as "virtual upper pivot point PU", accordingly).

In the above-described upper link structure, the transverse link 39 is arranged in substantially parallel to the axle, and in a vehicle planer view, a wheel side support point TBa of the transverse link 39 is arranged on the front side in the vehicle front-rear direction with respect to the wheel center (i.e., the axle).

In addition, the tension link 40 is provided on a slant to the axle more than a slant of the transverse link 39 (i.e., in a direction such that the wheel side support point is arranged on the rear side and the vehicle body side support point is arranged on the front side). A wheel side support point TSUa of the tension link 40 is arranged on the rear side in the vehicle front-rear direction with respect to the wheel center. Further, a vehicle body side support point TBUb of the transverse link 39 is arranged on the front side in the vehicle front-rear direction with respect to the wheel side support point TSUa of the tension link 40. Furthermore, a vehicle body side support point TSUb of the tension link 40 is arranged on the front side in the vehicle front-rear direction with respect to the wheel side support point TBUa of the transverse link 39.

Moreover, in the upper link structure, as illustrated in FIG. 7A, the first upper link is the transverse link 39 and the second upper link is the tension link 40 to cross each other and configure a tension link type. For this reason, the cross point of the transverse link 39 and the tension link 40 in a planer view is the virtual upper pivot point PU. The virtual upper pivot point PU moves toward the outer side in the vehicle width direction and frontward, when the turning is made so that the turning wheel 17FL is a turning outer wheel, in a similar manner to the virtual lower pivot point PL.

Accordingly, the virtual lower pivot point PL and the virtual upper pivot point PU, in a substantially parallel state, move toward the outer side in the vehicle width direction and frontward. Therefore, an enlargement in the kingpin slanted angle can be suppressed, as compared to the case where the upper link is configured with the letter A-shaped arm and the upper pivot point does not move in the vehicle width direction in a vehicle planer view. In addition, a decreased in the positive scrub radius can be suppressed. Thus, an increase in the rack axial force in the turning can be suppressed.

Hereinafter, a suspension geometry in the suspension device 1B will be studied in detail.

(Analysis of Rack Axial Force Component)

Figure 8:
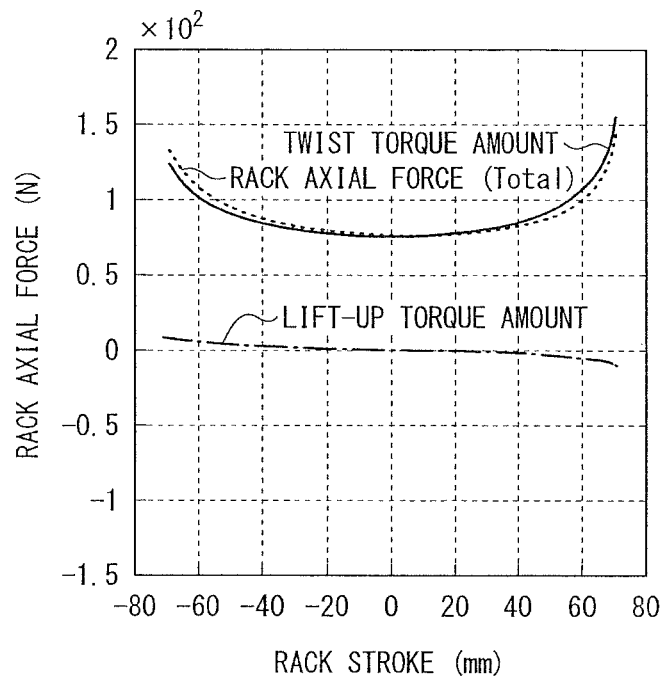
FIG. 8 is a view illustrative of a relationship between a rack stroke and a rack axial force in the turning.

FIG. 8 is a view illustrative of a relationship between a rack stroke and the rack axial force in the turning.

As illustrated in FIG. 8, rack axial force components mainly include the twist torque of the tire and the lift-up torque of the wheel, and the twist torque of the tire is dominant between them.

Thus, the rack axial force can be reduced by lowering the twist torque of the tire.

(Minimization of Tire Twist Torque)

Figure 9:
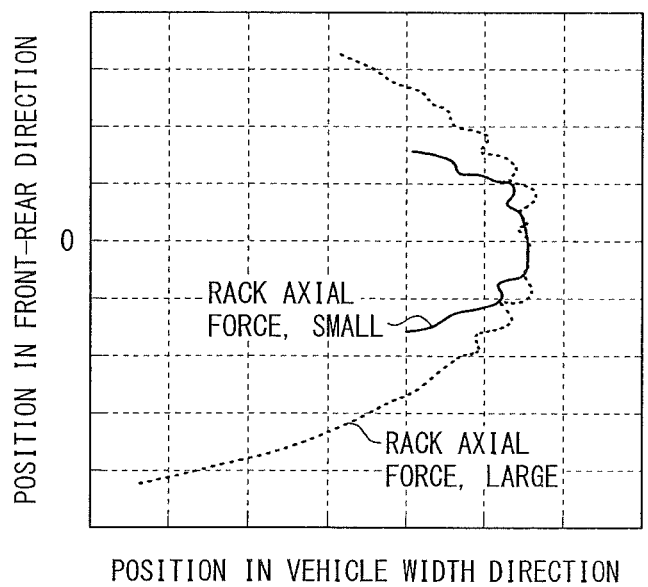
FIG. 9 is a view illustrative of a trajectory of the center in a tire grounding surface in the turning.

FIG. 9 is a view illustrative of a trajectory of the tire grounding surface center in the turning.

In FIG. 9, cases where a movement amount of the tire grounding surface center in the turning is large and small are both illustrated.

From the analysis of the rack axial force component, in order to reduce the rack axial force, it is effective to minimize the tire twist torque in the turning.

In order to minimize the tire twist torque in the turning, as illustrated in FIG. 9, the trajectory of the tire grounding surface center can be made smaller.

That is to say, the tire twist torque can be minimized by conforming the tire grounding surface center with the kingpin grounding point.

To be specific, it is effective to set the caster trail to 0 mm and the scrub radius to equal to or larger than 0 mm.
(Influence of Kingpin Slanted Angle)

Figure 10:
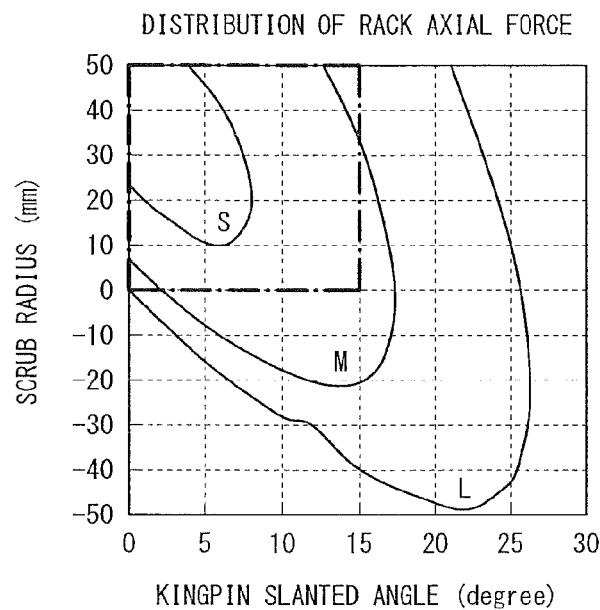
FIG. 10 is an isogram view illustrative of an example of distributions of the rack axial force in coordinate axes of a kingpin slanted angle and a scrub radius.

FIG. 10 is an isogram view illustrative of an example of distributions of the rack axial force in coordinates of the kingpin slanted angle and the scrub radius.

In FIG. 10, isograms of three cases where the rack axial forces are small, medium, and large are indicated as examples.

With respect to a tire twist torque input, as the kingpin slanted angle is larger, the rotation moment becomes larger and the rack axial force becomes larger. Thus, the kingpin slanted angle is intended to be set smaller than a certain value. In view of the relationship with the scrub radius, however, the kingpin slanted angle equal to or smaller than 15 degrees is capable of making the rack axial force small enough to an intended level.

It is to be noted that the domain surrounded by a dashed line (i.e., a boundary line) in FIG. 10 indicates a domain where the kingpin slanted angle is smaller than 15 degrees that can be estimated to a value where the transversal force exceeds the limit of friction in the limited domain in the turning, and where the scrub radius is equal to or larger than 0 mm in view of the above tire twist torque.

In one embodiment of the present disclosure, the above-described domain (i.e., in a direction where the kingpin slanted angle decreases from 15 degrees in the horizontal axis and in a direction where the scrub radius increases from zero in the vertical axis) is considered more suitable for setting. However, even if the scrub radius falls within a negative domain, a certain effect is obtainable by setting other conditions to be those in some embodiments of the present disclosure.

When the scrub radius and the kingpin slanted angle are determined specifically, for example, the isogram indicating distributions of the rack axial force illustrated in FIG. 10 is approximated as an n-order curve (where n is an integer equal to or greater than 2), and a value determined by the position of the inflection point (or a peak value) in the n-order curve can be employed from the domain surrounded by the dashed line.

Further, in the example illustrated in FIG. 7, the wheel center moves toward the turning inner side in the turning, in a vehicle planer view. Therefore, as in one embodiment of the present disclosure, an effect of decreasing the rack axial force can be further improved by positioning the steering rack member 14 on the front side with respect to the axle.

Figure 11:
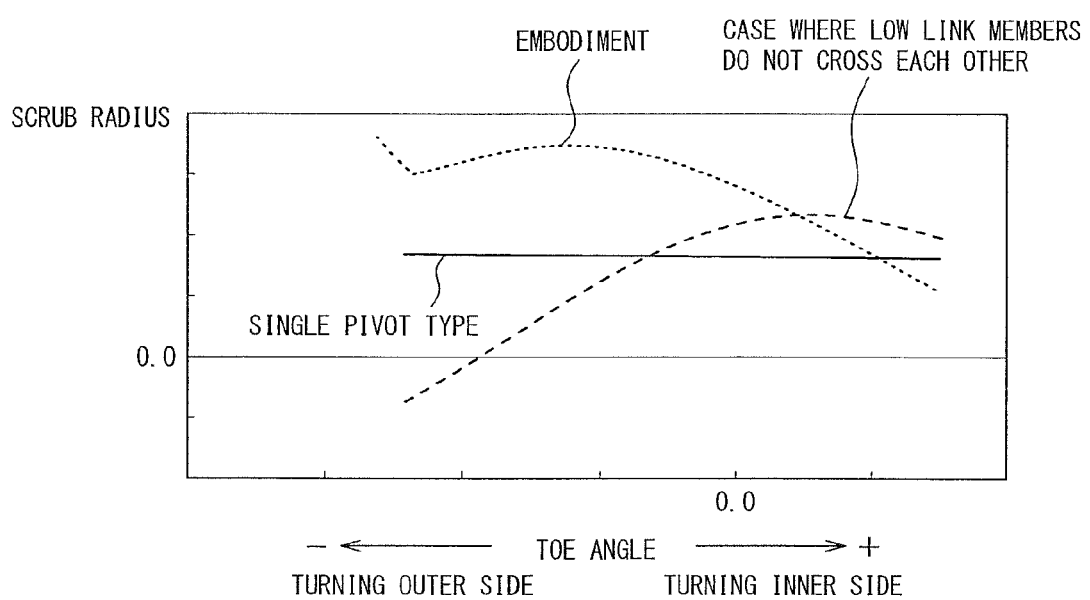
FIG. 11 is a view illustrative of a relationship between a toe angle and the scrub radius in the suspension device of compression type where lower link members do not cross each other and in the suspension device in one embodiment of the present disclosure.

FIG. 11 is a view illustrative of a relationship between the toe angle and the scrub radius of the suspension device of tension type where the lower link members do not cross each other and of the suspension device in one embodiment of the present disclosure.

As illustrated in FIG. 11, in one embodiment of the present disclosure, when compared with the case where the lower link members do not cross each other, the scrub radius near the neutral position (where the toe angle is 0) can be made larger.

In addition, in a direction where the turning angle to be the turning outer wheel becomes larger (i.e., "−" direction in FIG. 11), the scrub radius becomes larger and the rack axial force can be lowered more.

Further, by setting the caster angle to zero degree, the suspension stiffness can be improved.

Figure 12:
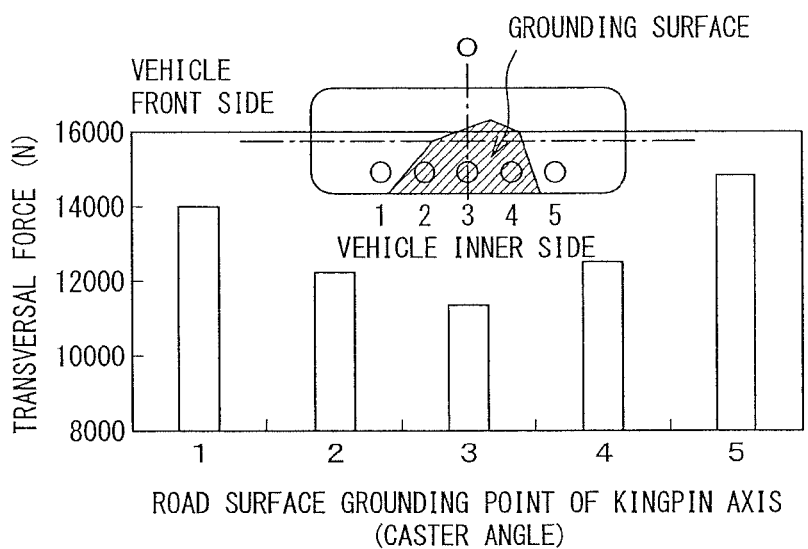
FIG. 12 is a graph illustrative of a relationship between a road surface grounding point of the kingpin axis and a transversal force.

Furthermore, FIG. 12 is a view illustrative of a relationship between a road surface landing point PT of a kingpin axis KS and the transversal force. In FIG. 12, codes 1 to 5 represent the road surface landing points of the kingpin axis KS from the vehicle front side to the vehicle rear side. The caster trail being set to 0 mm means that the road surface landing point of the kingpin axis KS conforms with the tire grounding center point (i.e., the point of application of force) O in the tire grounding surface, as the relationship between the road surface landing point of the kingpin axis KS and the transversal force is indicated by the code 3 in FIG. 12. Thus, the transversal force reduction effect can be improved more.

It is to be noted that also in cases where the grounding points of the kingpin axis KS in the tire grounding surface including the tire grounding center point (i.e., the point of application of force) O are located on the front side that is the code 2 and on the rear side that is the code 4, the transversal force can be lowered than cases where the grounding points of the kingpin axis KS are located at positions deviated from the tire grounding surface in the front-rear direction, as indicated by the code 1 and the code 5. In particular, the transversal force can be lowered in the case where the road surface landing point of the kingpin axis KS is located on the vehicle front side with respect to tire grounding center point (i.e., the point of application of force) O, as compared to the case where the road surface landing point of the kingpin axis KS is located on the vehicle rear side with respect to the tire grounding center point (i.e., the point of application of force) O.
(Straight Travel Performance Ensuring by Positive Scrub)

FIG. 6B is a view schematically illustrative of a self-aligning torque in the case of the positive scrub.

As illustrated in FIG. 6B, the restoring force (i.e., the self-aligning torque) to be exerted on the tire becomes stronger in proportion to the sum of the caster trail and the pneumatic trail.

In the case of the positive scrub, a distance $\epsilon c$ (see FIG. 6B) from the wheel center that is determined by the position of the foot of a perpendicular line, linearly taken down in a tire sideslip angle $\beta$ direction passing through the tire grounding center, from the grounding point of the kingpin axis can be considered to be a caster trail.

Therefore, as the scrub radius of the positive scrub is larger, the restoring force to be exerted on the tire in the turning becomes larger.

In one embodiment of the present disclosure, the kingpin axis is set to the positive scrub and a large initial scrub radius can be ensured as compared to the case where the lower link members do not cross each other, the influence on the straight travel performance caused by making the caster angle closer to 0 can be reduced. Also, by employing the Steer By Wire system, the straight travel performance finally intended can be ensured by the turning actuator 8.
(Operation of Suspension Device)

An operation of suspension device 1B in one embodiment of the present disclosure will be described below.

In the suspension device 1B in one embodiment of the present disclosure, two lower link members are each configured with letter I-shaped arms. The transverse link 37 is arranged from the axle carrier 33 in the vehicle width direction, and the tension link 38 is arranged to be slanted to the vehicle front side from the lower end of the axle carrier 33, with the transverse link 37 crossing the tension link 38.

To be specific, the wheel side support point TBLa of the transverse link 37 is arranged on the rear side in the vehicle front-rear direction with respect to the wheel center, whereas the wheel side support point TSLa of the tension link 38 is arranged on the front side in the vehicle front-rear direction with respect to the wheel center.

In addition, the vehicle body side support point TBLb of the transverse link 37 is arranged on the front side in the vehicle front-rear direction with respect to the wheel side support point TSLa of the tension link 38, whereas the vehicle body side support point TSLb of the tension link 38 is arranged on the front side in the vehicle front-rear direction with respect to the wheel side support point TBLa of the transverse link 37.

In the above-described suspension structure, the transversal force to be input into a wheel in the steering or the like can be loaded more onto the transverse link 37. Also, in the turning outer wheel, when the transversal force toward the vehicle inner side is input, the transverse link 37 rotates to the vehicle outer side and the tension link 38 rotates to the vehicle inner side, so as to achieve the toe-out performance at the wheel against the transversal force to be input.

In the above-described suspension structure, as illustrated in FIG. 6A, in the situation where the force in the vehicle front-rear direction is dominant, the wheel side support point TBLa of the transverse link 37 moves toward the vehicle inner side against the force in the vehicle front-rear direction (i.e., the force in the vehicle rear direction) that has been input at the tire grounding point. In addition, the wheel side support point TSLa of the tension link 38 moves toward the vehicle outer side. Therefore, against the force in the vehicle rear direction to be input, the compliance steer of turning the wheel in the toe-out direction is achievable.

In addition, in the above suspension structure, as illustrated in FIG. 6A, as to each lower link member and each upper link member, straight lines are virtually assumed to couple the wheel side support points TBLa, TSLa and TBUa, TBUb and the vehicle body side support points TBLb, TSLb, and TBUb, TSBb. Then, their cross points form the virtual pivot points PL and PU of the lower link structure and the upper link structure. A virtual straight line to couple the virtual lower pivot point PL and the virtual upper pivot point PU becomes the kingpin axis KS.

In one embodiment of the present disclosure, the kingpin axis KS is set to pass through the inside of the tire grounding surface. In addition, the kingpin axis KS is set such that the caster trail is arranged in the tire grounding surface. Thus, in a state where the turning wheel 17FL is traveling straight, that is a state where the steering wheel 2 is located at the neutral position, the grounding point PT of the kingpin axis KS is arranged on the front side of the tire front-rear direction with respect to the center line and on the outer side in the vehicle width direction with respect to an inner end in the vehicle width direction of the steering wheel 17FL.

More specifically, for example, the kingpin axis is configured such that the caster angle is 0 degrees, the caster trail is 0 mm, the scrub radius is more than 0 mm to be a positive scrub. Additionally, the kingpin slanted angle is configured to fall within a smaller angle within a range where the scrub radius can be a positive scrub (for example, equal to or smaller than 15 degrees).

By making such a suspension geometry, the trajectory of the tire grounding surface center in the turning is smaller, and the tire twist torque can be reduced.

Therefore, as the rack axial force can be made smaller, the moment around the kingpin axis can be made smaller, and the output of the turning actuator 8 can be reduced. Further, the direction of the wheel can be controlled by a smaller force. That is, improvements of steerability and stability are achievable.

Further, by providing the lower link members that cross each other, the support points of the lower link members can be located near the wheel center, the weight of the axle carrier 33 can be reduced.

In the suspension device 1B in one embodiment of the present disclosure, as the two lower link members are provided to cross each other, a virtual lower pivot point is configured to be easily located on the vehicle inner side with respect to the tire grounding surface center.

Therefore, the kingpin slanted angle is easily made close to 0 degrees, and in addition, the scrub radius can be easily set largely on the positive scrub side.

In addition, by setting the caster angle to 0 degrees and the caster trail to 0 mm, the straight travel performance in the suspension structure might be influenced, but such an influence is reduced by setting to the positive scrub. Further, together with the control by the turning actuator 8, the straight travel performance is ensured. That is, improvements of the steerability and stability are achievable.

Furthermore, as to the kingpin slanted angle limited to a certain range, as the turning is made by the turning actuator 8, it is possible to avoid a driver's feel of weight in the steering operation. Also, as to the kickback from the road surface caused by an external force, the turning actuator 8 is capable of resisting an external force, and an influence on the driver can be avoided. That is, improvements of the steerability and stability are achievable.

As described heretofore, in the suspension device 1B in one embodiment of the present disclosure, the transverse link 37 is provided in substantially parallel to the axle in the lower link structure, and the tension link 38 is arranged to cross the transverse link 37 in a vehicle planer view. Therefore, a virtual lower pivot point can be made closer to the vehicle body inner side in the vehicle width direction. Then, the kingpin axis defined by the virtual lower pivot point is configured such that the kingpin slanted angle is small, the kingpin axis passes through the inside of the tire grounding surface, and the caster trail is set to be located in the tire grounding surface, so that the moment around the kingpin axis can be made smaller.

Thus, the turning can be made with a smaller rack axial force, and in addition, as the direction of the wheel can be controlled by a smaller force, the steerability and stability can be improved.

Additionally, as a result of being capable of making the moment around the kingpin axis smaller, loads to be applied to the steering rack member 14 and the tie rod 15 can be reduced, and the part members can be simplified.

Further, as the turning actuator 8 capable of achieving Steer By Wire, the actuator having a lower drive capability can be used and reduced costs and lighter weight of the vehicle are achievable.

For example, when compared to the suspension device of Steer By Wire, in a known technology, approximately 10% in weight and 50% in cost can be reduced mainly by the simplification of the lower link members and downsizing of the turning actuator 8.

Moreover, since the caster trail is configured to increase in the turning, it is possible to suppress over-turning of the turning angle in the turning of generating a high transverse acceleration.

Further, since the virtual lower pivot point PL is moved toward the front outer side of the vehicle body by the transversal force to be exerted on the wheel in the turning, the virtual lower pivot point PL moves toward the outer side in the vehicle width direction, the scrub radius decreases, and the straight travel performance with the Self-Aligning Torque (i.e., SAT) is to be decreased.

In one embodiment of the present disclosure, however, the upper link configuration also has the tension link type configuration with the transverse link 39 and the tension link 40. Hence, in the turning, the virtual upper pivot point PU moves toward the front outer side in the vehicle width direction. It is thus possible to suppress a decrease in the scrub radius of the positive scrub, as compared to the case where only the virtual lower pivot point PL moves toward the outer side in the vehicle width direction. For this reason, the straight travel performance with the Self-Aligning Torque (i.e., SAT) can be ensured.

In addition to this, the virtual lower pivot point PL and the virtual upper pivot point PU move in substantially parallel, so that an increase in the caster angle can be suppressed and an increase in the kingpin slanted angle can be suppressed, too. Also in the turning, the turning can be made with a smaller rack axial force, and in addition, the direction of wheel can be controlled with a smaller force, so that the steerability and stability can be improved.

Figure 13:
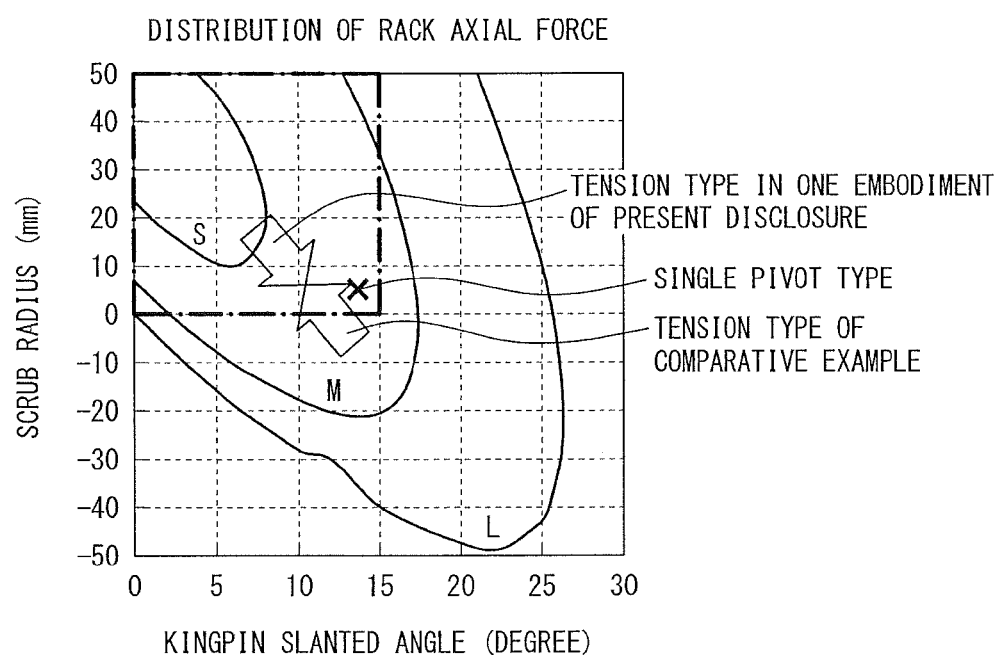
FIG. 13 is a schematic view illustrative of a relationship between the kingpin slanted angle and the scrub radius.

FIG. 13 is a schematic view illustrative of a relationship between the kingpin slanted angle and the scrub radius, in one embodiment of the present disclosure. It is to be noted that FIG. 13 illustrates the case where the above tension type is used in one embodiment of the present disclosure, and also illustrates as comparative examples, the case where the tension type where the lower link members do not cross each other is used, and the case where the single pivot system is employed.

As illustrated in FIG. 13, when the lower link structure is realized as a tension type in one embodiment of the present disclosure, the kingpin slanted angle can be made closer to 0 degrees side than to 15 degrees, and the scrub radius can be made larger on the positive scrub side, as compared to each of a single pivot system and a double pivot system in which the lower link members do not cross each other. Moreover, as the upper link structure is also realized as a tension type, the kingpin slanted angle can be set to near 0 degrees.

Also, in one embodiment of the present disclosure, the transverse link 37 as the lower link structure is arranged in substantially parallel to the axle, and in a vehicle planer view, the wheel side support point TBLa of the transverse link 37 is arranged on the rear side in the vehicle front-rear direction with respect to the wheel center. In addition, the tension link 38 is arranged to be slanted to the axle more than the slant of the transverse link 37 (i.e., arranged in a direction where the wheel side support point is arranged on the rear side and the vehicle body side support point is arranged on the front side). Then, the wheel side support point TSLa of the tension link 38 is arranged on the front side in the vehicle front-rear direction with respect to the wheel center. Further, the vehicle body side support point TBLb of the transverse link 37 is arranged on the front side in the vehicle front-rear direction with respect to the wheel side support point TSLa of the tension link 38. Furthermore, the vehicle body side support point TSLb of the tension link 38 is arranged on the front side in the vehicle front-rear direction with respect to the wheel side support point TBLa of the transverse link 37.

In such a lower link structure, the transversal force to be input to a wheel is made receivable by the transverse link 37 mainly. Additionally, in the above lower link structure, the vehicle body side support point TBLb of the transverse link 37 is located on the front side in the vehicle front-rear direction with respect to the wheel center. Therefore, when a transversal force (i.e., a force toward the inner side of the vehicle) is input to a wheel, the wheel side support point TBLa of the transverse link 37 moves toward the inner side of the vehicle, whereas the wheel side support point TSLa of the tension link 38 moves toward the outer side of the vehicle. Thus, against the transversal force to be input, the compliance steer of turning the wheel in the toe-out direction is achievable.

Also, in one embodiment of the present disclosure, the support point Xa of the wheel side of the tie rod 15 is located on the outer side in the vehicle width direction with respect to the wheel side support points TBLa and TSLa of the transverse link 37 and the tension link 38. Further, the vehicle body side support point Xb of the tie rod 15 is located on the rear side in the vehicle front-rear direction with respect to the wheel side support point Xa.

In such a lower link structure, in the situation where the force in the vehicle front-rear direction is dominant, the wheel side support point TBLa of the transverse link 37 moves toward the inner side of the vehicle against the force in the vehicle front-rear direction (i.e., the force in the vehicle rear direction) that has been input to the tire grounding point. Additionally, the wheel side support point Xa of the tie rod 15 rotates around the vehicle body side support point Xb, and moves toward the inner side of the vehicle, and the wheel side support point TSLa of the tension link 38 moves toward the inner side in the vehicle width direction. Therefore, the compliance steer of turning the wheel in the toe-out direction is achievable.

Accordingly, in one embodiment of the present disclosure, in the vehicle suspension device, the compliance steer performance against the force in the vehicle front-rear direction can be made more appropriate.

Figure 14A:
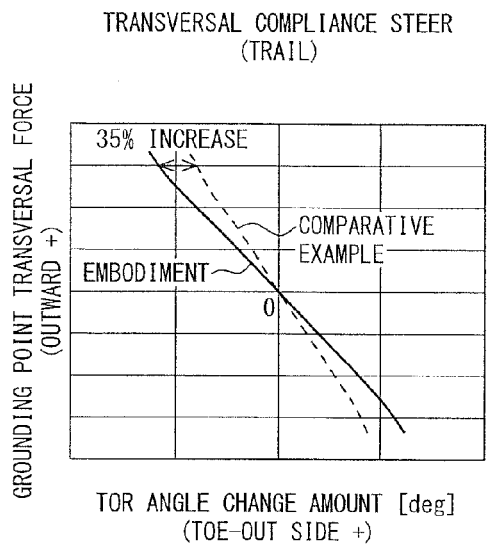
FIG. 14A is a view illustrative of transversal force compliance steer of the suspension device 1B and a comparative example.
Figure 14B:
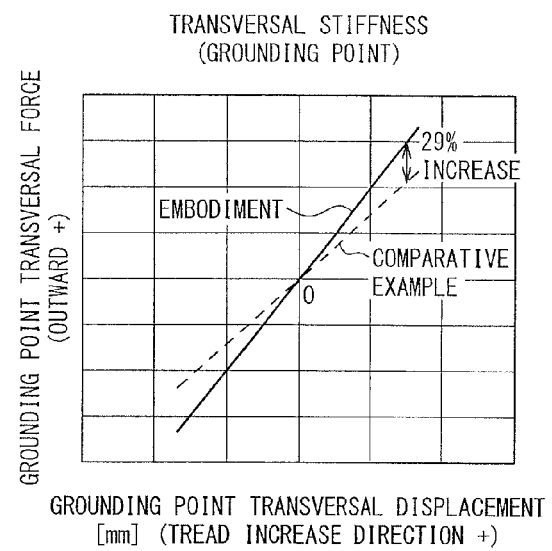
FIG. 14B is a view illustrative of transversal stiffness of the suspension device 1B and a comparative example.

FIG. 14A is a view illustrative of transversal force compliance steer of the suspension device 1B in one embodiment of the present disclosure and a comparative example, and FIG. 14B is a view illustrative of transversal stiffness of the suspension device 1B in one embodiment of the present disclosure and a comparative example.

In FIG. 14A and FIG. 14B, as a comparative example, the suspension device of tension type in which the lower link members do not cross each other is assumed.

As illustrated in FIG. 14A and FIG. 14B, in the case of the suspension device 1B in one embodiment of the present disclosure (i.e., solid lines in FIG. 14A and FIG. 14B), the transversal force compliance steer improves by 35% and the transversal stiffness improves by 29%, as compared to those of the comparative example (i.e., broken lines in FIG. 14A and FIG. 14B).

Figure 15:
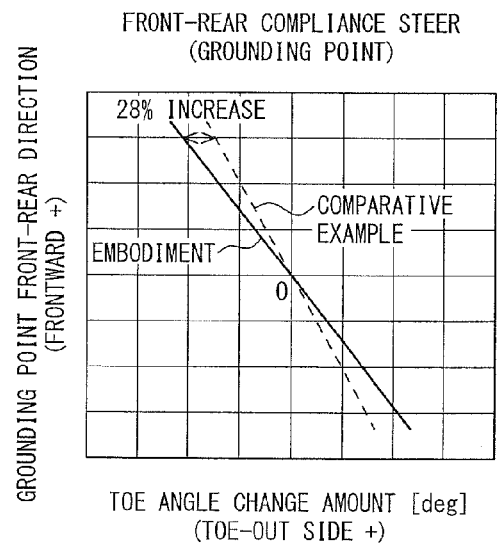
FIG. 15 is a view illustrative of front-rear force compliance steer of the suspension device 1B and a comparative example.

FIG. 15 is a view illustrative of front-rear force compliance steer of the suspension device 1B in one embodiment of the present disclosure and a comparative example.

In FIG. 15, as a comparative example, the suspension of compression type in which the lower link members do not cross each other is assumed.

As illustrated in FIG. 15, in the case of the suspension device 1B in one embodiment of the present disclosure (i.e., solid line in FIG. 15), the front-rear force compliance steer improves by 28%, as compared to that of the comparative example (i.e., a broken line in FIG. 15).

It is to be noted that in one embodiment of the present disclosure, the wheels 17FR, 17FL, 17RR, and 17RL correspond to tire wheels, tires, and wheel hub mechanisms WH, the transverse links 37 and 39 correspond to transverse link members, and the tension links 38 and 40 correspond to tension link members, respectively. The tie rod 15 corresponds to a tie rod.

(Detailed Configuration Example of Control/Drive Circuit)

Next, a detailed configuration example to realize the control/drive circuit unit 26 will be described with reference to FIG. 16 to FIG. 19B.

Figure 16:
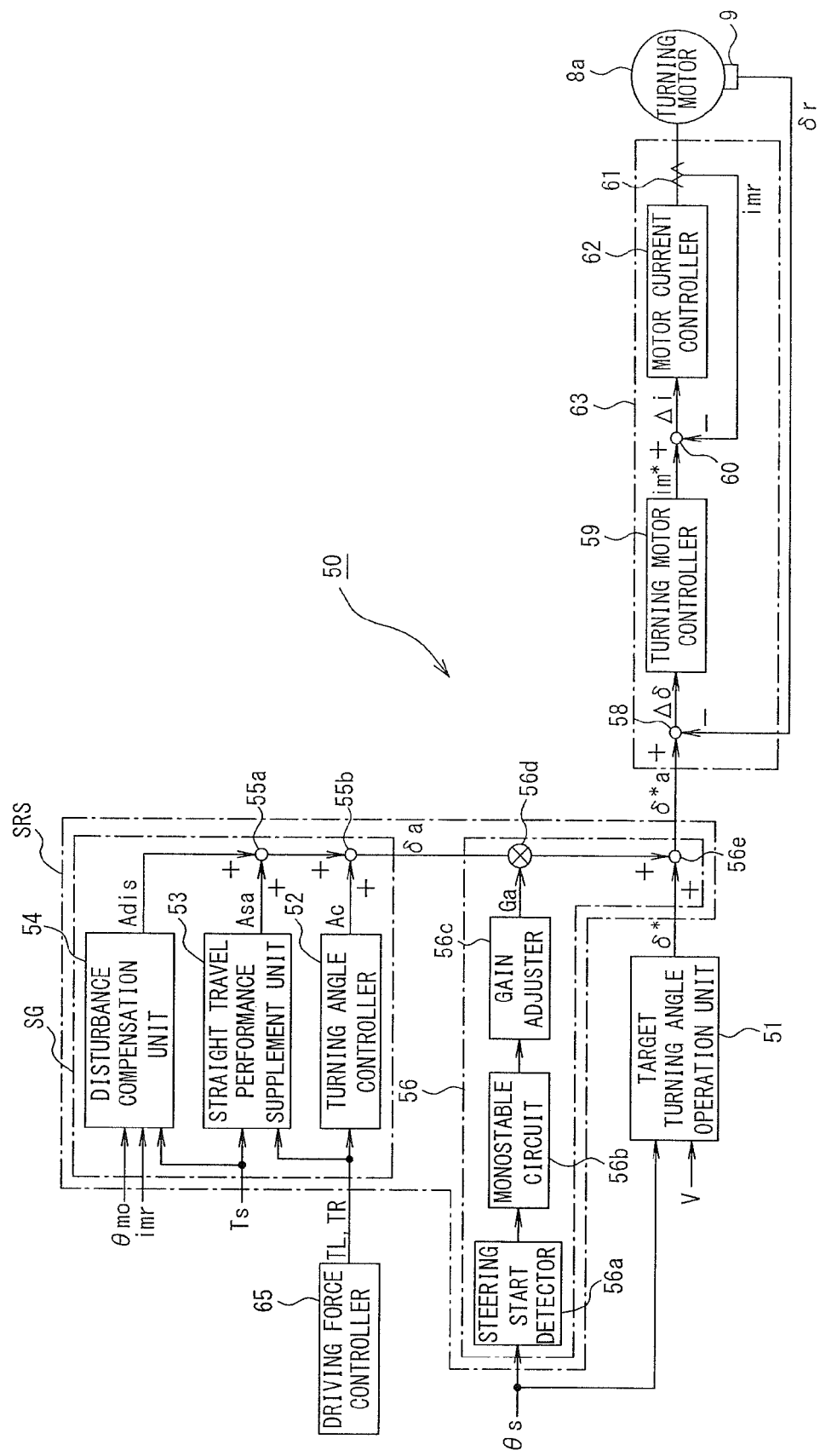
FIG. 16 is a block view illustrative of a specific configuration of a turning controller of FIG. 1.

The control/drive circuit unit 26 includes a turning controller 50, as illustrated in FIG. 16. The turning controller 50 includes a target turning angle operation unit 51, a turning angle controller 52, a straight travel performance supplement unit 53, a disturbance compensation unit 54, a delay controller 56, a turning angle deviation operation unit 58, a turning motor controller 59, a current deviation operation unit 60, and a motor current controller 62.

The vehicle speed V and the steering angle es detected by the steering angle sensor 4 are input into the target turning angle operation unit 51, and the target turning angle operation unit 51 is configured to calculate a target turning angle $\delta^*$ based on them.

The turning angle controller 52 is configured to calculate change amounts $\Delta fl$ and $\Delta fr$ of the turning wheels 17FL and 17FR by the compliance steer. These change amounts $\Delta fl$ and $\Delta fr$ are calculated by performing the following operations of expressions (1) and (2), based on drive forces TL and TR of left and right wheels output from the drive force controller 65 configured to control distributions of the drive forces of the turning wheels 17FL and 17FR, which are left and right drive wheels, and a compliance steer coefficient of in response to flexure of bushes of the transverse link 37 and the tension link 38 included in the lower link structure. Then, a variation difference of the calculated displacements $\Delta fl$ and $\Delta fr$ is calculated for obtaining a compliance steer control value Ac ($=\Delta fl-\Delta fr$) as a turning angle control value.

$$\Delta fl = af \cdot TL \quad (1)$$

$$\Delta fr = af \cdot TR \quad (2)$$

Drive forces TL and TR of the left and right wheels output from a drive force controller 71 configured to control distributions of the drive wheel drive force are input to the straight travel performance supplement unit 53, and in addition, the steering torque Ts detected by the steering torque sensor 5 is input to the straight travel performance supplement unit 53. The straight travel performance supplement unit 53 is configured to calculate the self-aligning torque Tsa based on them, and to obtain a self-aligning torque control value Asa ($=Ksa \cdot Tsa$) as a straight travel performance ensuring value, by multiplying the calculated self-aligning torque Tsa by a predefined turning angle correction gain Ksa.

Figure 17:
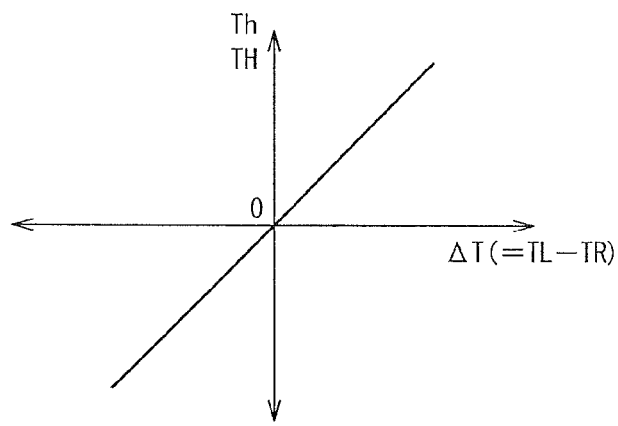
FIG. 17 is a map illustrative of generated torque control for calculating a self-aligning torque.

The self-aligning torque Tsa in the straight travel performance supplement unit 53 is obtained by firstly calculating a drive force difference $\Delta T$ ($=TL-TR$) of the drive forces TL and TR of the left and right wheels, and estimating the generated torque Th generated in the turning on a torque steer phenomenon, with reference to a generated torque estimation control map illustrated in FIG. 17 based on the calculated drive force difference $\Delta T$.

The generated torque estimation control map is set for vehicles in which the scrub radius is positive, that is a positive scrub. In the generated torque estimation control map, as illustrated in FIG. 17, the drive force difference $\Delta T$ is represented by the horizontal axis, the generated torque Th is represented by the vertical axis, and the drive force difference $\Delta T$ increases from zero in a positive direction. In other words, when the left wheel drive force TL increases while exceeding the right wheel drive force TR, in proportion to this, the generated torque Th increases in a direction of turning the vehicle to the right (i.e., positive direction) from zero.

On the other hand, when the drive force difference $\Delta T$ increases from zero in a negative direction, that is, when the right wheel drive force TR increases, while exceeding the left wheel drive force TL, in proportion to this, the generated torque Th increases in a direction of turning the vehicle to the left (i.e., negative direction) from zero.

The straight travel performance supplement unit 53 is configured to obtain the self-aligning torque Tsa by subtracting the generated torque Th from the steering torque Ts detected by the steering torque sensor 5.

It is to be noted that the calculation of the self-aligning torque Tsa is not limited to the calculation based on the drive force difference $\Delta T$ of the left and right drive forces as stated above. A difference in left and right brake forces can be used for the calculation similarly.

In the calculation of the self-aligning torque Tsa, a yaw rate sensor configured to detect a yaw rate $\gamma$ of the vehicle and a transverse acceleration sensor configured to detect a transverse acceleration Gy of the vehicle are provided. The transversal force Fy is calculated based on a differentiation value of the yaw rate and the transverse acceleration Gy according to the equation of motion of the vehicle, and the transversal force Fy is multiplied by the pneumatic trail $\epsilon n$.

Furthermore, the self-aligning torque Tsa can be calculated based on the steering angle $\theta s$ detected by the steering angle sensor 4 and the vehicle speed V by referring to a control map which is obtained by doing an actual measurement of a relationship between the steering angle $\theta s$ of the steering wheel 2 and the self-aligning torque Tsa, with the vehicle speed V as a parameter, or is calculated by simulation.

Furthermore, the self-aligning torque Tsa may be calculated by operating the expression (3) below based on the vehicle speed V, an actual turning angle $\delta r$ of the turning wheels 17FR and 17FL calculated based on a pinion angular degree detected by the pinion angle sensor 13, and the yaw rate $\gamma$ detected by the yaw rate sensor 22b.

$$Tsa = 2 \cdot \varepsilon \cdot Kf \left( \frac{\beta + Lf}{V} \right) \gamma - \delta r \quad (3)$$

$$\beta = \frac{\beta}{A} \cdot \frac{Lf}{L} \cdot \delta r$$

$$A = 1 - \left( \frac{m}{2L^2} \right) \left( \frac{Lf \cdot Kf - Lr \cdot Kr}{Kf \cdot Kr} \right) V^2$$

$$B = 1 - \left( \frac{m}{L} \right) \left( \frac{Lf}{Lr \cdot Kr} \right) V^2$$

In the above expression, $\epsilon c$ is a caster trail, Kf is a cornering power per front wheel, $\beta$ is a gravity center slip angle, Lf is a gravity center distance between front wheel axles, Kr is a cornering power per rear wheel, Lr is a gravity center distance between rear wheel axles, m is a vehicle weight, and L is a distance between front wheel axle and rear wheel axle.

In the expression (3), by setting the caster trail $\epsilon$ to a value obtained by subtracting a caster trail $\epsilon c2$ to be set in one embodiment of the present disclosure from a caster trail $\epsilon c0$ set in a general suspension device, it is possible to calculate the self-aligning torque Tsa to be supplemented for a shortage in the suspension device 1B to be used in one embodiment of the present disclosure.

The disturbance compensation unit 54 is configured to receive the steering torque Ts from the steering torque sensor 5, a rotation angle $\theta$mo from the turning actuator angle sensor 9, and a motor current imr from the motor current detector 61, to estimate the disturbance input into the vehicle by dividing it into every frequency band, and to calculate a disturbance compensation value Adis to suppress the disturbances.

The disturbance compensation unit 54, as described in Japanese Patent Publication No. 2007-237840, for example, includes plural disturbance estimation units configured to estimate the disturbances with the steering torque Ts which is a steering input by the driver and a turning input by the turning actuator 8 being control inputs, based on a difference between a value of the control input that has been made to pass through a low-pass filter in the model of using an actual steering state amount as a control amount, and a value obtained by the control amount that has been made to pass through a reverse characteristic of the above model and the low-pass filter. Each of the disturbance units is configured to separate the disturbance into each frequency band, by differentiating the cutoff frequencies of the low-pass filter.

Then, an adder 55a is configured to add the disturbance compensation value Adis and the self-aligning torque control value Asa, respectively calculated by the disturbance compensation unit 54 and the straight travel performance supplement unit 53. An adder 55b is configured to add an added output from the adder 55a and the compliance steer control value Ac operated by the turning angle controller 52, and to calculate a straight travel performance ensuring control value δa. This straight travel performance ensuring control value δa is supplied to the delay controller 56.

Herein, as illustrated in FIG. 16, a straight travel performance ensuring unit SG is configured with the turning angle controller 52, the straight travel performance supplement unit 53, the disturbance compensation unit 54, and the adders 55a and 55b. A turning response performance set unit SRS is configured with the straight travel performance ensuring unit SG and the delay controller 56 to be described below.

The delay controller 56 includes, as illustrated in FIG. 16, a steering start detector 56a, a monostable circuit 56b, a gain adjuster 56c, and a multiplier 56d.

The steering start detector 56a is configured to detect a timing when right steering or left steering is done from a state of maintaining the neutral position, based on the steering angle θs detected by the steering angle sensor 4, and to output to the monostable circuit 56b a steering start signal SS representing a steering start from the neutral state.

In addition, the monostable circuit 56b is configured to output to the gain adjuster 56c a control start delay signal of making an on state for a predefined delay period, for example, 0.1 seconds, based on the steering start signal output from the steering start detector 56a.

The gain adjuster 56c is configured to set a control gain Ga to "0", when the control start delay signal is in the on state, to set the control gain Ga to "1", when the control start delay signal is in an off state, and to output to the multiplier 56d the control gain Ga which has been set.

The multiplier 56d is configured to receive the straight travel performance ensuring control value δa output from the straight travel performance ensuring unit SG, to multiply the straight travel performance ensuring control value δa by the control gain Ga, and to supply a multiplication result to an adder 56e to which the target turning angle δ* has been input from the target turning angle operation unit 51.

Thus, in the delay controller 56, when the steering start detector 56a detects the steering start state of the right steering or the left steering from the state of maintaining the neutral state, the gain adjuster 56c is configured to set the control gain Ga, to be multiplied by the straight travel performance ensuring control value δa, to "0" so as to stop the straight travel performance ensuring control of adding the straight travel ensuring control value δ calculated by the straight travel performance ensuring unit SG to the target turning angle δ* for a predetermined period, for example, 0.1 seconds to be set by the monostable circuit 56b. When the output signal from the monostable circuit 56b is reversed to the off state after the elapse of 0.1 seconds, the gain adjuster 56c is configured to set the control gain Ga to "1" to start the straight travel performance ensuring control of adding the straight travel performance ensuring control value δa to the target turning angle δ*.

In addition, in the delay controller 56, while the steering of the steering wheel 2 is continuing, the steering start detector 56a is not configured to detect the steering start from the neutral state. Thus, the monostable circuit 56b is configured to maintain the off state, and the gain adjuster 56c is configured to set the control gain Ga to "1". For this reason, the straight travel performance ensuring control value δa operated by the straight travel performance ensuring unit SG is supplied to the adder 56e without change. Therefore, a multiplication value Ga·δa, obtained by multiplying the straight travel performance ensuring control value δa by the control gain Ga, is added to the target turning angle δ*, and the straight travel performance ensuring control is performed.

The turning angle deviation operation unit 58 is configured to subtract the actual turning angle δr output from the turning actuator angle sensor 9 of a turning motor 8a included in the turning actuator 8 from an added target turning angle δ*a, obtained by adding the straight travel ensuring control value δa to the target turning angle δ* output from the adder 56e, to calculate a turning angle deviation Δδ, and to output the calculated turning angle deviation Δδ to the turning motor controller 59.

The turning motor controller 59 is configured to calculate a target drive current im* of the turning motor 8a included in the turning actuator 8 so that the angle deviation Δδ to be input is zero, and to output the calculated target drive current im* to the current deviation operation unit 60.

The current deviation operation unit 60 is configured to subtract an actual motor drive current imr output from the motor current detector 61 configured to detect a motor current to be supplied to the turning motor 8a included in the turning actuator 8 from the target drive current im* that has been input, to calculate a current deviation Δi, and to output the calculated current deviation Δi to the motor current controller 62.

The motor current controller 62 is configured to perform feedback control, so that the current deviation Δi to be input becomes zero, that is, the actual motor drive current imr follows the target drive current im*, and to output the actual motor drive current imr to the turning motor 8a.

Herein, an actuator controller 63 includes the turning angle deviation operation unit 58, the turning motor controller 59, the current deviation operation unit 60, the motor current detector 61, and the motor current controller 62. The actuator controller 63 is configured to control the turning angle δr detected by the turning actuator angle sensor 9 configured to detect the rotation angle of the turning motor 8a included in the turning actuator 8 so as to conform to the target turning angle δ*. For this reason, when the vehicle is in a straight travel state and the target turning angle δ* became "0", the turning angle δr is controlled to conform to the target turning angle δ*. Accordingly, when the above-described straight travel performance ensuring unit SG is a main straight travel performance ensuring unit, a subsidiary straight travel performance ensuring unit is configured.

(Operation of Turning Controller)

Next, operations of the turning controller in the first embodiment of the present disclosure will be described with reference to FIG. 18A to FIG. 19B.

Currently, the vehicle is assumed to be travelling straight while holding the steering wheel 2 at the neutral position.

In this straight travel state, the target turning angle $\delta^*$ operated by the target turning angle operation unit 51 becomes zero. In this situation, since the steering wheel 2 holds the neutral position, the drive forces or brake forces of the turning wheels 17FL and 17FR, which are left and right drive wheels, are equal. Therefore, the displacements $\Delta fl$ and $\Delta fr$ in the turning angles of the turning wheels 17FL and 17FR by the compliance steer calculated by the turning angle controller 52 in the expressions (1) and (2) have equal values. Accordingly, the compliance steer correction amount Ac is a value obtained by subtracting the variation $\Delta fr$ from the variation $\Delta fl$, and hence the compliance steer correction amount Ac becomes zero.

Similarly, also in the straight travel performance supplement unit 53, as the drive forces TL and TR are equal, the drive force difference $\Delta T$ becoming zero also makes zero the generated torque Th calculated by referring to the generated torque estimation control map illustrated in FIG. 17. On the other hand, as the steering wheel 2 is not steered in the straight travel state, the steering torque Ts is also zero, the self-aligning torque Tsa is also zero, and the self-aligning torque control value Asa is also zero.

On the other hand, the disturbance compensation unit 54 is configured to calculate a disturbance compensation value Adis for suppressing a disturbance. Thus, the straight travel performance ensuring control value $\delta a$ includes only the disturbance compensation value Adis. The straight travel performance ensuring control value $\delta a$ is supplied to the multiplier 56d of the delay controller 56.

In the delay controller 56, the steering start detector 56a is not configured to detect the steering start, and the output from the monostable circuit 56b maintains the off state. Therefore, the gain adjuster 56c is configured to set the control gain Ga to "1" to supply the control gain Ga to the multiplier 56d. From the multiplier 56d, the straight travel performance ensuring control value $\delta a$ is supplied to the adder 56e without change, and is added to the target turning angle $\delta^*$ of zero. Thus, the added target turning angle $\delta^* a$ depending on the disturbance compensation value Adis is calculated, so that the turning angle of the turning motor 8a of the turning actuator 8 is controlled to conform to the added target turning angle $\delta^* a$. Hence, the straight travel in which an influence from the disturbance is removed is enabled.

Thus, since the road surface steps or the road surface friction coefficients of the front wheels 17FR and 17FL are different, when the front wheels 17FR and 17FL are made to turn by a disturbance that has been input from the road surface, the turning actuator 8 is rotated. In response to this, a change in the rotation angle $\theta mo$ detected by the turning actuator angle sensor 9 outputs the disturbance compensation value Adis depending on such a change of the rotation angle $\theta mo$.

For this reason, the turning actuator 8 is controlled according to the disturbance compensation value Adis, so that the torque against the turning made by the road surface input into the suspension device 1B can be produced. Thus, the straight travel performance of the suspension device 1B can be ensured by the straight travel performance ensuring unit SG.

In addition, when no disturbance is detected by the disturbance compensation unit 54 in the straight travel state of the vehicle, the straight travel performance ensuring control value $\delta a$ calculated by the straight travel performance ensuring unit SG is zero, and the target turning angle $\delta^*$ output from the target turning angle operation unit 51 is also zero. Therefore, the added target turning angle $\delta^*$ output from the adder 56e is also zero.

Accordingly, when a turning angle displacement occurs at the turning motor 8a included in the turning actuator 8, the actuator controller 63 is configured to output the motor current imr to cancel the turning angle displacement, and then the turning wheels 17FR and 17FL are returned to the turning angle of the straight travel state. Thus, the straight travel performance can be ensured by the actuator controller 63.

However, when a state of steering the steering wheel 2 to the right (or left) from a state of maintaining the straight travel state with the steering wheel 2 being held at the neutral position, the steering start detector 56a is configured to detect the shift to the turning state by the steering from the straight travel state.

Hence, the control delay signal that turns into the on state for a predefined period, for example, 0.1 seconds is output from the monostable circuit 56b to the gain adjuster 56c. Thus, the gain adjuster 56c is configured to set the control gain Ga to "0", while the control delayed signal is continuing the on state. Therefore, the multiplication output from the multiplier 56d is "zero", and an output of the straight travel performance ensuring control value $\delta a$ to the adder 56e is stopped.

Figure 19A:
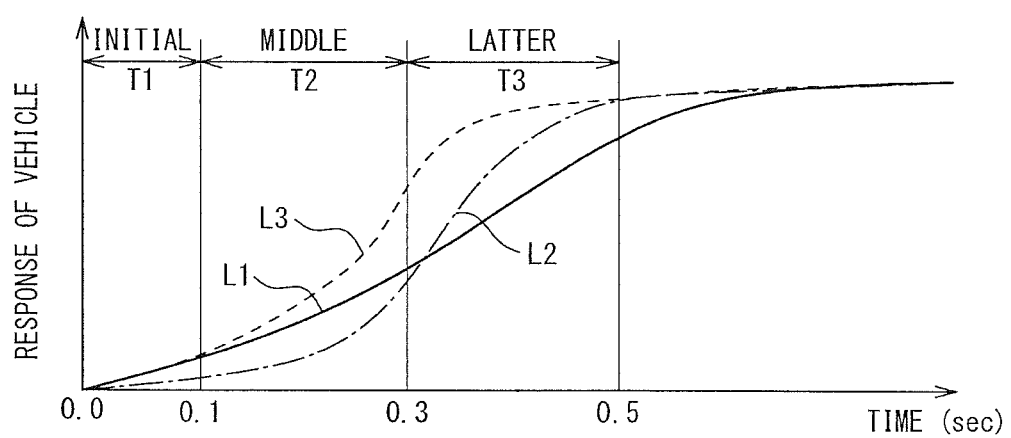
FIG. 19A is a characteristic diagram illustrative of changes in the response performance of the vehicle in the turning response performance.
Figure 19B:
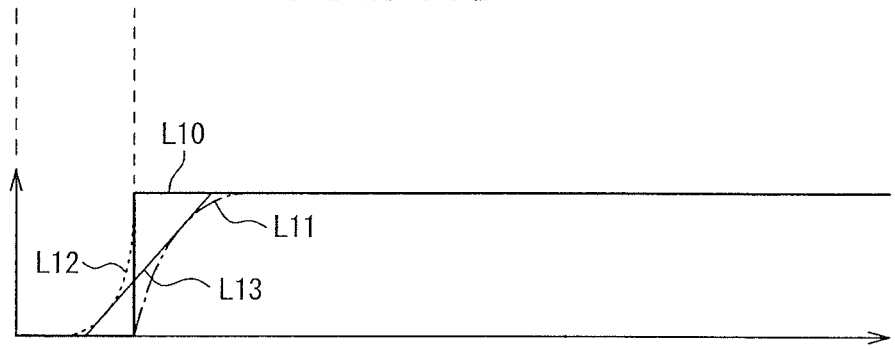
FIG. 19B is a characteristic diagram illustrative of switch timing of control properties in the turning response performance.

Thus, since the control gain Ga is set to "0" during an initial response period T1 of 0.1 seconds from the time when the steering starts from the neutral position of the steering wheel 2, the multiplication output from the multiplier 56d is "0" and the straight travel performance ensuring control for the target turning angle $\delta^*$ is stopped as indicated by the solid line in FIG. 19B.

Accordingly, the steering angle $\theta s$ detected by the steering angle sensor 4 is supplied to the target turning angle operation unit 51, and then the target turning angle $\delta^*$ operated by the target turning angle operation unit 51 is supplied to the turning angle deviation operation unit 58 without change. For this reason, the turning motor 8a is driven to rotate to conform to the target turning angle $\delta^*$. In the meantime, the straight travel performance ensuring control in the straight travel performance ensuring unit SG is stopped.

Thus, in the initial response period T1, the road surface grounding point of the kingpin axis KS is set at the grounding center position in the tire grounding surface. In addition, the turning to be made by the suspension device 1B in which the caster angle has been set to zero is started.

Figure 18A:
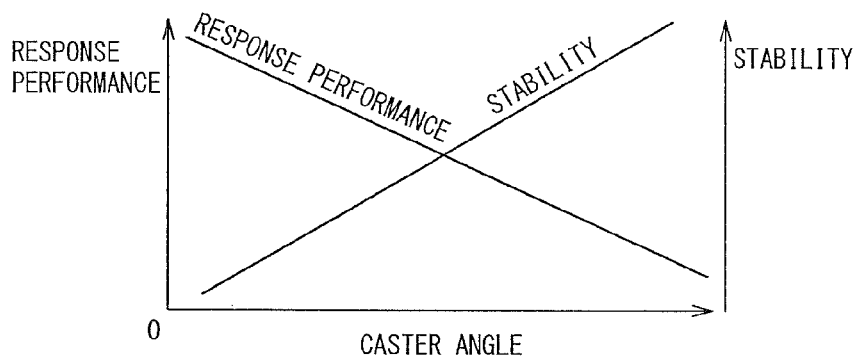
FIG. 18A is a view illustrative of a relationship among a caster angle, response performance, and stability in properties of the suspension device.
Figure 18B:
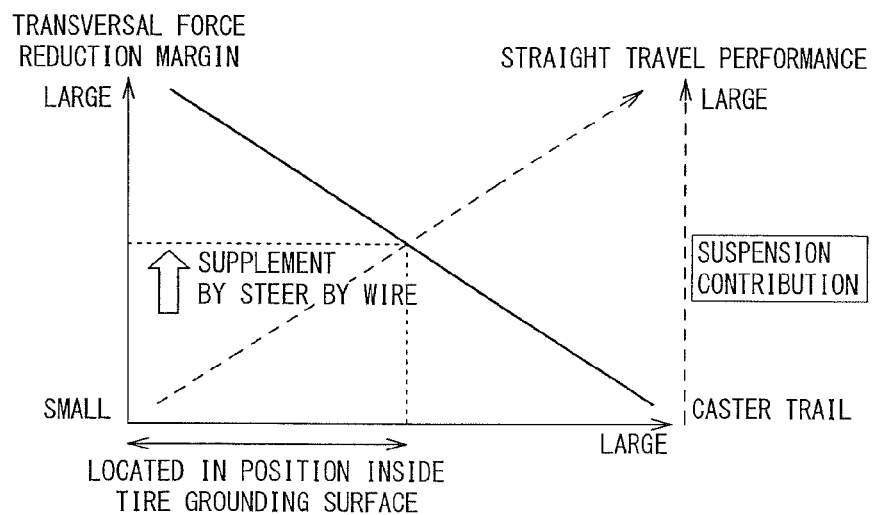
FIG. 18B is a view illustrative of a relationship among a caster trail, a transversal force reduction margin, and a straight travel performance in properties of the suspension device.

In this situation, the caster angle of the suspension device 1B is set to zero. As to a relationship among the caster angle, turning response performance, and steering stability, as illustrated in FIG. 18A, when the caster angle is zero, the turning response performance is high, but the steering stability cannot be ensured. In other words, there is a trade-off relationship between the turning response performance and the steering stability with respect to the caster angle.

Therefore, in the initial state where the steering started from the neutral position, the straight travel performance ensuring control by Steer By Wire is not performed. Therefore, the suspension device 1B is configured to make the initial turning.

In this initial response period T1, the suspension device 1B has the caster angle of zero, and has a high steering response performance as described above. Hence, as indicated by a performance line L1 of a solid line in FIG. 19A, a higher turning response performance (i.e., yaw rate) than the turning response performance (i.e., yaw rate) in the vehicle having a steering system of a general Steer By Wire as indicated by a performance line L2 of a dashed line is achievable. In this situation, since the change in the turning angle is a change in the steering angle by the driver's steering of the steering wheel 2, a sense of discomfort will not be given to the driver.

However, when the initial response period T1 elapses by only the turning response performance of the suspension device 1B and the turning continues, the turning response performance of the vehicle by the steering becomes sensitive in a middle response period T2 and a latter response period T3, as indicated by a performance line L3 of a broken line in FIG. 19A. Also, a turn-in phenomenon toward the inner side of the vehicle becomes large from the middle response period T2 to the latter period response period T3.

Therefore, in the first embodiment, as illustrated in FIG. 19B, after the initial response period T1 elapses, for example, 0.1 seconds later, the straight travel performance ensuring control for the target turning angle δ* by the straight travel performance ensuring unit SG configured with the turning angle controller 52, the straight travel performance supplement unit 53, and disturbance compensation unit 54 starts in a step-by-step manner. Thus, the turning response performance of the vehicle of the suspension device 1B is suppressed, and drifting of the vehicle is also suppressed. In addition, as indicated by a dotted line in FIG. 18B, the straight travel performance of the suspension device 1B is supplemented by Steer By Wire control, so that the steering stability can be ensured.

Subsequently, when the middle response period T2 elapses, for example, 0.3 seconds later, even when compared to the turning response performance of a general vehicle, the straight travel performance ensuring control of the straight travel performance ensuring unit SG enables the further suppression of the turning response performance more to tend to understeer. Hence, as indicated by the performance line L1 of the solid line in FIG. 19A, the steering stability can be improved, and an ideal turning response performance of the vehicle as indicated by the performance line L1 is achievable.

As described above, according to the steering device of the vehicle in one embodiment of the present disclosure, in the suspension device 1B, the first link 37 and the second link 38 of the lower link structure are configured to cross each other, in a vehicle planer view. The kingpin axis KS is made to pass through the inside of the tire grounding surface with a steering wheel being in a state of the neutral position, and the caster trail is set within the tire grounding surface. It is thus possible to reduce the moment around the kingpin axis KS.

Accordingly, in the first embodiment, the turning can be made by a smaller rack axial force, and the direction of the wheel can be controlled by a smaller force. In other words, the steerability and stability can be improved.

In this manner, in the first embodiment, by setting at least the kingpin axis KS to pass through the inside of the tire grounding surface, the suspension device 1B itself is configured to improve the turning response performance. In addition to this, the turning angle control, supplement for the straight travel performance, and disturbance compensation are performed to control the turning properties by the straight travel performance ensuring unit SG of the Steer By Wire system, i.e., SBW, so as to ensure the straight travel performance of the suspension device 1B.

For this reason, when the right or left steering is made from the state of holding the steering wheel 2 at the neutral position, a high response performance is ensured by using the high turning response performance of the suspension device 1B itself in the initial response period T1. Subsequently, the initial response period T1 elapses and the middle response period T2 starts, and then importance is to be placed on the steering stability more than the turning response performance. By setting the control gain Ga to "1" at the gain adjuster 56c of the delay controller 56 in the Steer By Wire system, i.e., SBW, the straight travel performance ensuring control starts with the straight travel performance ensuring control value δa that has been calculated by the straight travel performance ensuring unit SG.

For this reason, by starting the straight travel performance ensuring control such as the turning angle control, supplement for the straight travel performance, and disturbance compensation, the high turning response performance of the suspension device 1B is suppressed to ensure the steering stability. Furthermore, in the latter response period T3, by further reducing the turning response performance to suppress the turn-in phenomenon of turning toward the inner side of the vehicle, and further suppressing the vehicle drifting as a tendency to understeer, so that the intended turning response control can be established.

Furthermore, the provision of the turning angle controller 52 enables the straight travel performance ensuring control in consideration of the displacements of the turning wheels 17FL and 17FR by the compliance steer. For this reason, it is possible to set low the stiffness of a bush to be inserted in the support part on the vehicle body 1A side with the first link 37 and the second link 38 that are lower link members, and it is possible to improve the ride comfort by lowering the vibration transmission ratio from the road surface to the vehicle body 1A through the first link 37 and the second link 38.

It is to be noted that in the above first embodiment, the case where the turning controller 50 is configured with hardware has been described. However, the first embodiment is not limited to this. For example, the target turning angle operation unit 51 and the straight travel performance ensuring unit SG are configured with operation processing units, such as microcomputers, for example, and in the operation processing unit, the turning control process illustrated in FIG. 20 may be carried out.

Figure 20:
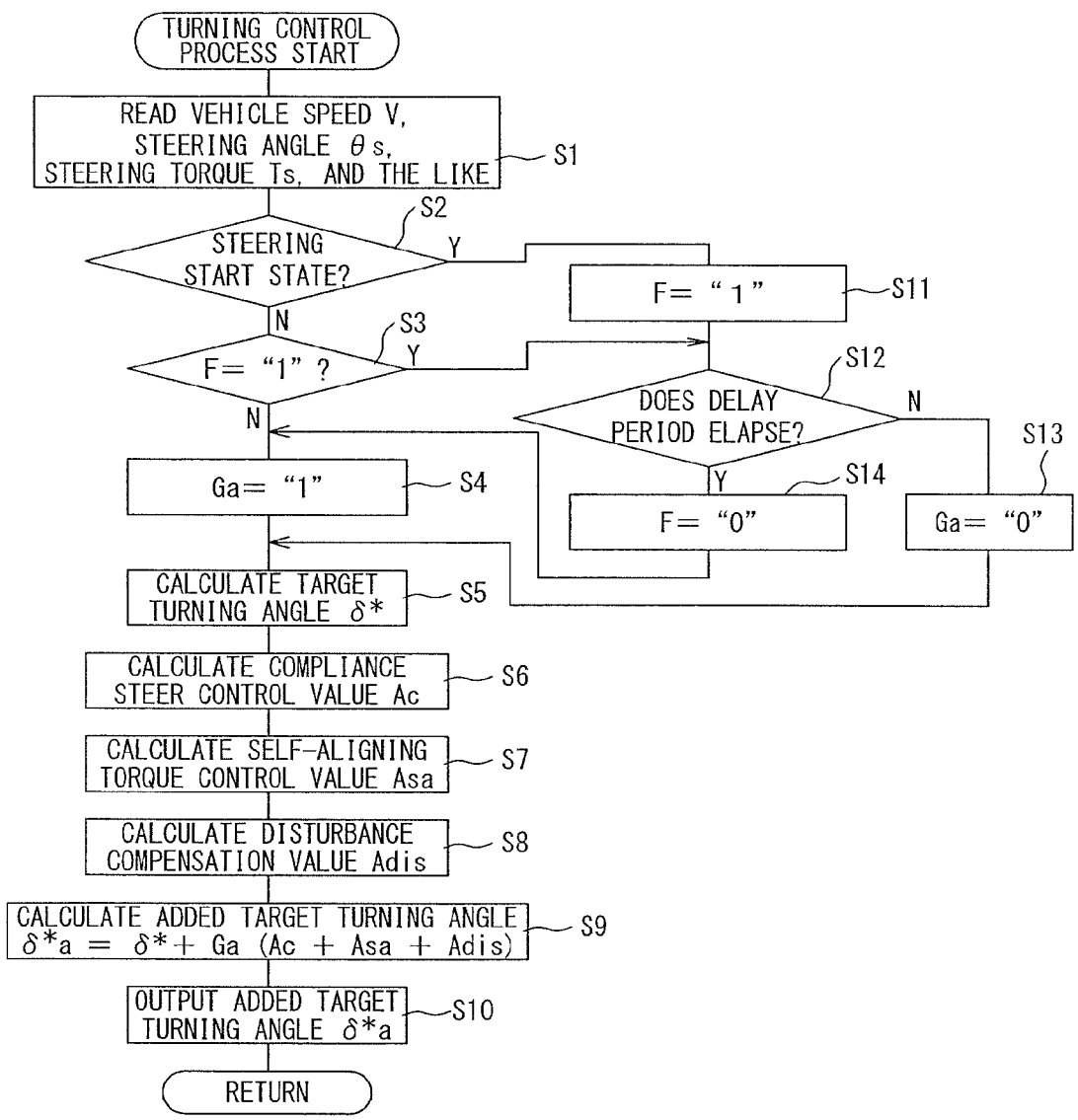
FIG. 20 is a flowchart illustrative of an example of a turning control process procedure.

In the turning control process, as illustrated in FIG. 20, at first, in step S1, data necessary for the operation process are read, such as the vehicle speed V, the steering angle θs detected by the steering angle sensor 4, the rotation angle θmo detected by the turning actuator angle sensor 9, the drive forces TL and TR of the left and right wheels of the drive force controller 71, and the steering torque Ts detected by the steering torque sensor 5. Subsequently, processing goes to step S2, and it is determined whether or not the steering start state in which the steering to the right or the left is made from the state where the steering wheel 2 holds the neutral position based on the steering angle θs detected by the steering angle sensor 4. When not in the steering start state, processing goes to step S3.

In step S4, it is determined whether or not a control flag F representing a steering start control state is set to "1". When the control flag F is reset to "0", processing goes to step S4, sets the control gain Ga to "1", and goes to step S5.

In step S5, in a similar manner to the target turning angle operation unit 51 as described above, the target turning angle δ* is calculated based on the vehicle speed V and the steering angle θs.

Subsequently, processing goes to step S6, in a similar manner to the turning angle controller 52 as described above, the drive forces TL and TR of the left and right wheels are multiplied by the compliance steer coefficient sf, and the displacements Δfl and Δfr of the turning wheels 17FL and 17FR by the compliance steer are calculated. Then, the compliance steer control value Ac is calculated based on them.

Next, processing goes to step S7, in a similar manner to the straight travel performance supplement unit 53 as described above, the generated torque Th to be generated in the turning on the torque steer phenomenon is estimated based on the drive force difference ΔT (=TL−TR) of the drive forces TL and TR of the left and right wheels, by referring to the generated torque estimation control map illustrated in FIG. 17. Then, the generated torque Th is subtracted from the steering torque Ts to calculate the self-aligning torque Tsa, and the self-aligning torque Tsa is multiplied by a predefined gain Ksa to calculate the self-aligning torque control value Asa. Herein, the calculation of the self-aligning torque Tsa is not limited to the above calculation, and various calculation methods that have been described together with the straight travel performance supplement unit 53 are applicable.

Subsequently, processing goes to step S8, the disturbances to be input into a vehicle are divided to each frequency band for estimation respectively, based on the motor rotation angle θmo from the turning actuator angle sensor 9, the steering torque Ts, and the motor current imr detected by the motor current detector 61. Then, the disturbance compensation value Adis to suppress these disturbances is calculated.

Next, processing goes to step S9, the added target turning angle δ*a is calculated based on the target turning angle δ*, the compliance steer control value Ac, the self-aligning torque control value Asa, and the disturbance compensation value Adis, by performing the following expression (4).

$$\delta^*a = \delta^* + Ga(Ac + Asa + Adis) \quad (4)$$

Subsequently, processing goes to step S10, the added target turning angle δ*a calculated in step S9 is output to the turning angle deviation operation unit 58 in FIG. 16, and then processing returns to step S1.

Also, when a determination result of step S2 is the steering start state, processing goes to step S11. After the control flag F is set to "1", processing goes to step S12. Furthermore, when in the determination result of step S3, the control flag F is set to "1", processing goes directly to step S12.

In step S12, whether or not a predefined delay period (for example, 0.1 seconds) has elapsed is determined. In this situation, when the delay period does not elapse, processing goes to step S13, After the control gain Ga is set to "0", processing goes to step S5 and then the target turning angle δ* is calculated.

In addition, in a determination result of step S12, when a predefined delay period (for example, 0.1 seconds) elapses, processing goes to step S14. After the control flag F is reset to "0", processing goes to step S4 and sets the control gain Ga to "1".

Even in the turning instruction angle operation process illustrated in FIG. 20, when not in the steering start state in which the steering to the left or right starts from the state where the steering wheel 2 is held at the neutral position, the straight travel performance ensuring control of adding the straight travel performance ensuring control value δa to the target turning angle δ* is performed, the straight travel performance ensuring control value δa being obtained by adding the compliance steer control value Ac, the self-aligning torque control value Asa, and the disturbance compensation value Adis to the target turning angle δ*.

In contrast, when the steering start state where steering to the left or right starts from the state where the steering wheel 2 is held at the neutral position, the straight travel performance ensuring control is stopped until a predefined delay period elapses, because the control gain Ga is set to "0". For this reason, only the target turning angle δ* is output to the turning angle deviation operation unit 58, and hence, the turning motor 8a included in the turning actuator 8 is driven to rotate. Accordingly, as to the initial turning response performance, the high turning response performance of the suspension device itself is set, and the high turning response performance is obtainable.

Then, when the delay period elapses, the control gain Ga is set to "1". Therefore, the turning motor 8a included in the turning actuator 8 is driven to rotate by use of a value obtained by adding the straight travel performance ensuring control value δa to the target turning angle δ*, the straight travel performance ensuring control value δa being obtained by adding the compliance steer control value Ac, the self-aligning torque control value Asa, and the disturbance compensation value Adis to the target turning angle δ*. Accordingly, the high turning response performance of the suspension device 1B is suppressed. In addition, the straight travel performance of the suspension device 1B is also ensured, and an ideal turning response performance is obtainable.

Even in the turning control process, in the straight travel state of the vehicle, the target turning angle δ* is zero. When no disturbance occurs, the target turning angle δ* is supplied directly to the turning angle deviation operation unit 58 in FIG. 16. Hence, the straight travel performance is ensured by the actuator controller 63 in a same manner as described above.

In the turning control process of FIG. 20, the process of step S5 corresponds to the target turning angle operation unit 51, the process of step S6 corresponds to the turning angle controller 52, the process of step S7 corresponds to the straight travel performance supplement unit 53, the processes of steps S5 to S7 correspond to the straight travel performance ensuring unit SG, the processes of steps S2 to S4 and steps S11 to S14 correspond to the delay controller 56, and the processes of steps S2 to S14 correspond to the turning response performance set unit SRS.

It is to be noted that in the turning control process of FIG. 20, the description that the control to be performed by the turning response performance set unit SRS is realized by software has been described, but the first embodiment is not limited to this. Software processing including the control of the turning response performance set unit SRS and the control of the actuator controller 63 may be carried out.

In the above-described first embodiment, the case where the straight travel performance ensuring unit SG is configured with the turning angle controller 52, the straight travel performance supplement unit 53, and the disturbance compensation unit 54 has been described, but the first embodiment is not limited to this. One or two of the turning angle controller 52, the straight travel performance supplement unit 53, and the disturbance compensation unit 54 may be omitted.

Advantageous Effect of First Embodiment (1) There is provided a vehicle suspension device, comprising: an axle carrier having an axle of rotatably supporting a turning wheel; a first lower link member and a second lower link member configured to individually couple a vehicle side support part and the axle carrier, on a lower side of the axle; and a first upper link member and a second upper link member configured to individually couple the vehicle side support part and the axle carrier, on an upper side of the axle, wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward, when the turning wheel is turned from a straight travel state, and wherein the first upper link member and the second upper forms an upper link structure having a component moving a virtual upper pivot point represented by a cross point of the first upper link member and the second upper link member, in a planer view, at least toward the outer side and frontward in the vehicle width direction, when the turning wheel is turned from the straight travel state.

Thus, the virtual lower pivot point of the cross point of the first lower link member and the second lower link member that cross each other in the turning of the turning wheel moves toward the outer side in the vehicle width direction. Thus, the scrub radius becomes smaller in the range of the positive scrub. In this situation, the virtual upper pivot point configured with the first upper link member and the second upper link member has a component of moving to the outer side in the vehicle width direction, so that a decrease in the scrub radius can be suppressed.

Then, when the moving direction of the virtual upper pivot point matches the moving direction of the virtual lower pivot point, in addition to the suppression of a decrease in the scrub radius, a change in the kingpin slanted angle or the caster angle is suppressed, so that the rack axial force in the turning of the turning wheel is enabled to remain small.

(2) A kingpin axis of coupling the upper pivot point and the lower pivot point may be configured to pass through the inside of a tire grounding surface.

Hence, as the moment around the kingpin axis can be made smaller, the turning can be made with a smaller rack axial force, and the direction of the wheel can be controlled with a smaller force.

Thus, the steerability and stability can be improved.

(3) The first lower link member and the second lower link member may be configured to cross each other, and to form the lower link structure of a tension link type in which the second lower link member is slanted on the front side of the vehicle with respect to the vehicle width direction.

Accordingly, the virtual lower pivot point represented by the cross point, in a planer view, of the first lower link member and the second lower link member can be set on the inner side in the vehicle width direction. Therefore, the scrub radius can be set larger in the range of positive scrub in the relationship with the virtual upper pivot point.

(4) The first lower link member may be configured with a transverse link member, and the second lower link member is configured with a tension link member.

According to such a configuration, in the situation where the force in the vehicle front-rear direction is dominant, the joint part on the wheel side of the transverse link member moves toward the inner side of the vehicle against the rearward force in the vehicle front-rear direction that has been input to the tire ground point. In addition, the joint part on the wheel side of the tie rod member rotates around the joint part on the vehicle body side and moves toward the outer side of the vehicle. Furthermore, the joint part on the wheel side of the tension link member moves toward the inner side of the vehicle.

Therefore, the compliance steer that turns the wheel in the toe-out direction is achievable.

Accordingly, in the vehicle suspension device, the compliance steer property for the force in the vehicle front-rear direction can be made more appropriate.

(5) The first upper link member and the second upper link member may be configured to cross each other, and to form an upper link structure of a tension link type in which the second upper link member is more slanted on the front side of the vehicle than the first upper link member with respect to the vehicle width direction.

Accordingly, the virtual upper pivot point represented by the cross point, in a planer view, of the first upper link member and the second upper link member can be moved toward the front outer side in the vehicle width direction in substantially parallel to the virtual lower pivot point represented by the cross point, in a planer view, of the first lower link member and the second lower link member. Accordingly, a decrease in the scrub radius in the range of positive scrub can be suppressed, and a change in the kingpin axis or the caster angle can be suppressed.

(6) The first upper link member may be configured with a transverse link, and the second upper link member is configured with a tension link.

For this reason, in the situation in which the force in the vehicle front-rear direction is dominant, the joint part on the wheel side of the transverse link member moves toward the inside of the vehicle against the rearward force in the vehicle front-rear direction that has been input to the tire ground point. In addition, the joint part on the wheel side of the tie rod member rotates around the joint part on the vehicle body side and moves toward the outer side of the vehicle. Furthermore, the joint part on the wheel side of the tension link member moves toward the inside of the vehicle.

Therefore, the compliance steer that turn the wheel in the toe-out direction is achievable.

Accordingly, in the vehicle suspension device, the compliance steer property for the force in the vehicle front-rear direction can be made more appropriate.

(7) The turning wheel in Steer By Wire system may be suspended by the vehicle suspension device.

Thus, by use of the turning actuator in Steer By Wire system, the control to supplement the straight travel performance can be performed to correspond to the setting of the kingpin axis or the setting of the caster trail in one embodiment of the present disclosure, and improvements in the steerability and stability are achievable.

(8) The suspension device may be configured such that the kingpin axis is set to pass through the tire grounding surface to place more importance on the turning response performance than the straight travel performance. The turning controller includes a turning actuator of turning the turning wheel, and an actuator controller of controlling the turning actuator so that a turning angle of the turning wheel corresponds to a steering angle of the steering wheel. The turning actuator is controlled to supplement degradation in the straight travel performance caused by placing importance on the turning response performance.

Thus, since the moment around the kingpin axis of the suspension device can be made smaller, the turning can be made with a smaller rack axial force, and the direction of the wheel can be controlled by a smaller force.

Thus, the turning response performance can be improved. Here, by setting the caster angle to near 0, it is possible to configure the suspension device in which the turning response performance can be further improved.

(9) The turning controller may be configured with Steer By Wire system.

With such a configuration, the degradation in the straight travel performance by ensuring the turning response performance of the suspension device can be supplemented by Steer By Wire system.

(10) The steer by wire system may include a straight travel performance ensuring unit configured to control the turning actuator to supplement the degradation in the straight travel performance by placing importance on the turning response performance of the suspension device.

With such a configuration, the straight travel performance ensuring unit is capable of supplementing the degradation in the straight travel performance of the suspension device, and improvements of the steerability and stability are achievable.

(11) The straight travel performance ensuring unit may be configured to calculate a self-aligning torque to ensure the straight travel performance of the suspension device.

With such a configuration, by ensuring the high response performance of the suspension device at the straight travel performance ensuring unit, the degraded straight travel performance can be ensured by the self-aligning torque and the steerability and stability can be improved.

(12) When steering of a steering wheel starts from a neutral position, the turning controller may include a turning response performance set unit configured to adjust straight travel performance ensuring control by the straight travel performance ensuring unit and to set initial turning response performance to the turning response performance of the suspension device itself.

With such a configuration, when the turning starts from the neutral position of the steering wheel, the initial response performance can be set to high turning response performance. Then, by adjusting the turning response performance of the suspension device itself by the straight travel performance ensuring control by the straight travel performance ensuring unit, an ideal turning response performance can be ensured.

(13) The turning controller may include a turning angle controller configured to estimate compliance steer and correct a displacement of the turning wheel.

With such a configuration, the stiffness of the bush inserted into the vehicle body side support part of the lower arm included in the suspension device can be decreased, and the ride comfort of the vehicle can be improved.

(14) The turning controller may include a turning response performance set unit configured, when the steering of the steering wheel starts from at least the neutral position, to set a high turning response performance with the turning response performance of the suspension device itself in an initial turning state, and when a turning state where the initial turning state elapses, to set the turning response performance needed for the straight travel performance ensuring control by the straight travel performance ensuring unit.

With such a configuration, it is possible to ensure the high turning response performance of the suspension device in the initial turning, and to carry out the control of ensuring the straight travel performance of the suspension device itself of the turning actuator at the straight travel performance ensuring unit, after the initial set period elapses, so that an ideal turning response performance is obtainable.

(15) The turning response performance set unit may include a delay controller configured to delay the straight travel performance ensuring control by the straight travel performance ensuring unit, when the steering wheel is steered from the neutral position.

With such a configuration, since the delay controller delays starting of the straight travel performance ensuring control of the straight travel performance ensuring unit, the initial turning response performance can be made to be the high turning response performance of the suspension device itself.

(16) The delay controller may include a gain adjuster configured to adjust starting of the straight travel performance ensuring control by the straight travel performance ensuring unit.

With such a configuration, the gain adjuster is configured not to perform the straight travel performance ensuring control by setting the gain for the straight travel performance ensuring control value in the straight travel performance ensuring control to, for example, "0", and to perform the straight travel performance ensuring control by setting the gain to, for example, "1" that is larger than "0". Therefore, the straight travel performance ensuring control can be started. Accordingly, the provision of the gain adjuster enables the adjustment of starting of the straight travel performance ensuring control with ease.

(17) The delay controller may start the straight travel performance ensuring control by the straight travel performance ensuring unit, after delaying 0.1 seconds from a steering start timing of the steering to the left or to the right from a state where the steering wheel holds the neutral position.

With such a configuration, the high turning response performance of the suspension device itself can be utilized as the initial turning response performance, effectively. After an initial period of 0.1 seconds elapses, the straight travel performance ensuring control by the straight travel performance ensuring unit is made to start so that an ideal turning response performance is achievable.

(18) The turning controller may include: a target turning angle operation unit configured to operate a target turning angle according to the steering angle; an adder configured to add a straight travel performance ensuring control value of the straight travel performance ensuring unit to the target turning angle operated by the target turning angle operation unit; a turning motor controller configured to form a motor instruction current to conform an added output from the adder with the turning angle of the turning motor included in the turning actuator; and a motor current controller configured to form a motor drive current conforming with the motor instruction current, to be supplied to the turning motor.

With such a configuration, the target turning angle operation unit is configured to calculate the target turning angle according to the steering angle of the steering wheel. The adder is configured to add the straight travel performance ensuring control value to the target turning angle. The turning motor controller is configured to form the target motor current to conform the rotation angle of the turning motor included in the actuator with the added output from the adder. The motor current controller is configured to form the motor drive current to conform with the target motor instruction current. By outputting the motor drive current to the turning motor, driving of the turning motor can be controlled according to the steering angle of the steering wheel. Herein, the target turning angle output from the target turning angle operation unit is adjusted at the turning response performance controller, so that optimal turning control is achievable.

(19) There is provided a turning control method of a turning wheel supported by a suspension device, the suspension device comprising: an axle carrier having an axle of rotatably supporting a turning wheel; a first lower link member and a second lower link member configured to individually couple a vehicle side support part and the axle carrier, on a lower side of the axle; and a first upper link member and a second upper link member configured to individually couple the vehicle side support part and the axle carrier, on an upper side of the axle, wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward, when the turning wheel is turned from a straight travel state, and wherein the first upper link member and the second upper forms an upper link structure having a component moving a virtual upper pivot point represented by a cross point of the first upper link member and the second upper link member, in a planer view, at least toward the outer side and frontward in the vehicle width direction, when the turning wheel is turned from the straight travel state, wherein the suspension device is configured such that a kingpin axis passes through inside of a tire grounding surface at a neutral position of a steering wheel, the turning control method comprising: turning the turning wheel by to an actuator according to a steering state of the steering wheel; and operating the actuator and applying a restoration force for self-aligning to the turning wheel to ensure straight travel performance of a vehicle.

With such a configuration, since the moment around the kingpin axis of the suspension device can be made smaller, the turning can be made with a smaller rack axial force, and the direction of the wheel can also be controlled with a smaller force.

Thus, the turning response performance can be improved. In this situation, by setting the caster angle to near 0, the suspension device can be configured with higher turning response performance. The straight travel performance in short in the suspension device is ensured by applying a restoring force for self-aligning to the turning wheel.

(20) There is provided a turning control method of a turning wheel supported by a suspension device, the suspension device comprising: an axle carrier having an axle of rotatably supporting a turning wheel; a first lower link member and a second lower link member configured to individually couple a vehicle side support part and the axle carrier, on a lower side of the axle; and a first upper link member and a second upper link member configured to individually couple the vehicle side support part and the axle carrier, on an upper side of the axle, wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward, when the turning wheel is turned from a straight travel state, and wherein the first upper link member and the second upper forms an upper link structure having a component moving a virtual upper pivot point represented by a cross point of the first upper link member and the second upper link member, in a planer view, at least toward the outer side and frontward in the vehicle width direction, when the turning wheel is turned from the straight travel state, wherein the suspension device is configured such that a kingpin axis passes through inside of a tire grounding surface at a neutral position of a steering wheel, the turning control method comprising:

detecting a displacement in the steering angle when the steering wheel is steered; controlling a turning actuator configured to turn a turning wheel based on a detection result;

controlling a straight travel performance of a vehicle by operating the turning actuator and applying a restoration force for self-aligning onto the turning wheel;

setting a turning response performance of the suspension device itself to an initial turning response performance at an initial turning start period, when the turning starts from a neutral position of the steering wheel; and starting control of ensuring a straight travel performance of the vehicle of the turning actuator after an initial set period elapses.

In the above-described method, since the moment around the kingpin axis of the suspension device can be made smaller, the turning can be made with a smaller rack axial force, and the direction of the wheel is also controllable with a smaller force.

Thus, the turning response performance can be improved. In this situation, by setting the caster angle to near 0, the suspension device can be configured with higher turning response performance. The straight travel performance in short in the suspension device is ensured by applying a restoring force for self-aligning to the turning wheel.

Further, a turning response performance of the suspension device itself is set to an initial turning response performance at an initial turning start period, when the turning starts from a neutral position of the steering wheel; and control of ensuring a straight travel performance of the vehicle of the turning actuator is initiated after an initial set period elapses. Therefore, the turning response performance of the vehicle by the suspension device 1B is suppressed and drifting of the vehicle is also suppressed, and the straight travel performance of the suspension device is supplemented by the turning control, so that the steering stability can be ensured.

(21) In the control of ensuring the straight travel performance of the vehicle, the self-aligning torque may be calculated based on a turning state, and the self-aligning torque calculated is applied to the turning wheel.

In the above-described method, the degraded straight travel performance can be ensured by the self-aligning torque by ensuring the high response performance of the suspension device, and the steerability and stability can be improved.

(22) The initial setting period may be set to 0.1 seconds.

In the above-described method, the high turning response performance of the suspension device itself can be utilized by the initial turning response performance, effectively. After an initial period of 0.1 seconds elapses, the straight travel performance ensuring control by the straight travel performance ensuring unit is started, so that an ideal turning response performance is achievable.

APPLICATION EXAMPLE 1

In the first embodiment, the kingpin axis is configured to be set within the tire ground surface. As one example, the case where when the caster trail is set to near zero and the road surface grounding point of the kingpin axis is made to conform with the tire grounding surface center point has been described.

On the other hand, in this application example, the setting condition of the kingpin axis is limited to a range from the tire grounding surface center point to a front end of the tire grounding surface.

(Advantageous Effect)

By setting the road surface grounding point of the kingpin axis to a range from the tire grounding surface center point to a front end of the tire grounding surface, both of ensuring of straight travel performance and a reduction in weight of the steering operation is enabled. That is, improvements of steerability and stability are achievable.

APPLICATION EXAMPLE 2

In the first embodiment, in plane coordinates illustrated in FIG. 10, as an example, the domain surrounded by a dashed line has been exemplified as a suitable domain for setting. On the other hand, an isogram of the rack axial force is assumed to be a boundary, and a domain within a range indicated by the boundary (i.e., in a decreasing direction of the kingpin slanted angle and in an increasing direction of the scrub radius) can be set to be a domain suitable for setting.

(Advantageous Effect)

The maximum of the rack axial force is assumed, so that the suspension geometry can be set to the range of equal to or smaller than the maximum.

APPLICATION EXAMPLE 3

In each of the first and the second embodiments and application examples, the case where the suspension device 1B is applied to a vehicle including the steering device in Steer By Wire system has been described with examples. However, instead of Steer By Wire system, a suspension device 1B is applicable to a steering device in a mechanical steering mechanism.

In this case, the kingpin axis is determined according to a condition based on the above studies, after the caster trail is set within the tire grounding surface, a link arrangement of the mechanical steering mechanism is configured to correspond thereto.

(Advantageous Effect)

Also in the steering mechanism having a mechanical structure, the moment around the kingpin axis is reduced, so that the steering force demanded for the driver can be made smaller. Improvements of the steerability and stability are achievable.

(Second Embodiment)

A second embodiment of the present disclosure will be described with reference to FIG. 21 to FIG. 23B.

In the second embodiment, instead of the upper link structure of tension type as described in the above described first embodiment, the upper link structure of compression type is used.

Figure 21:
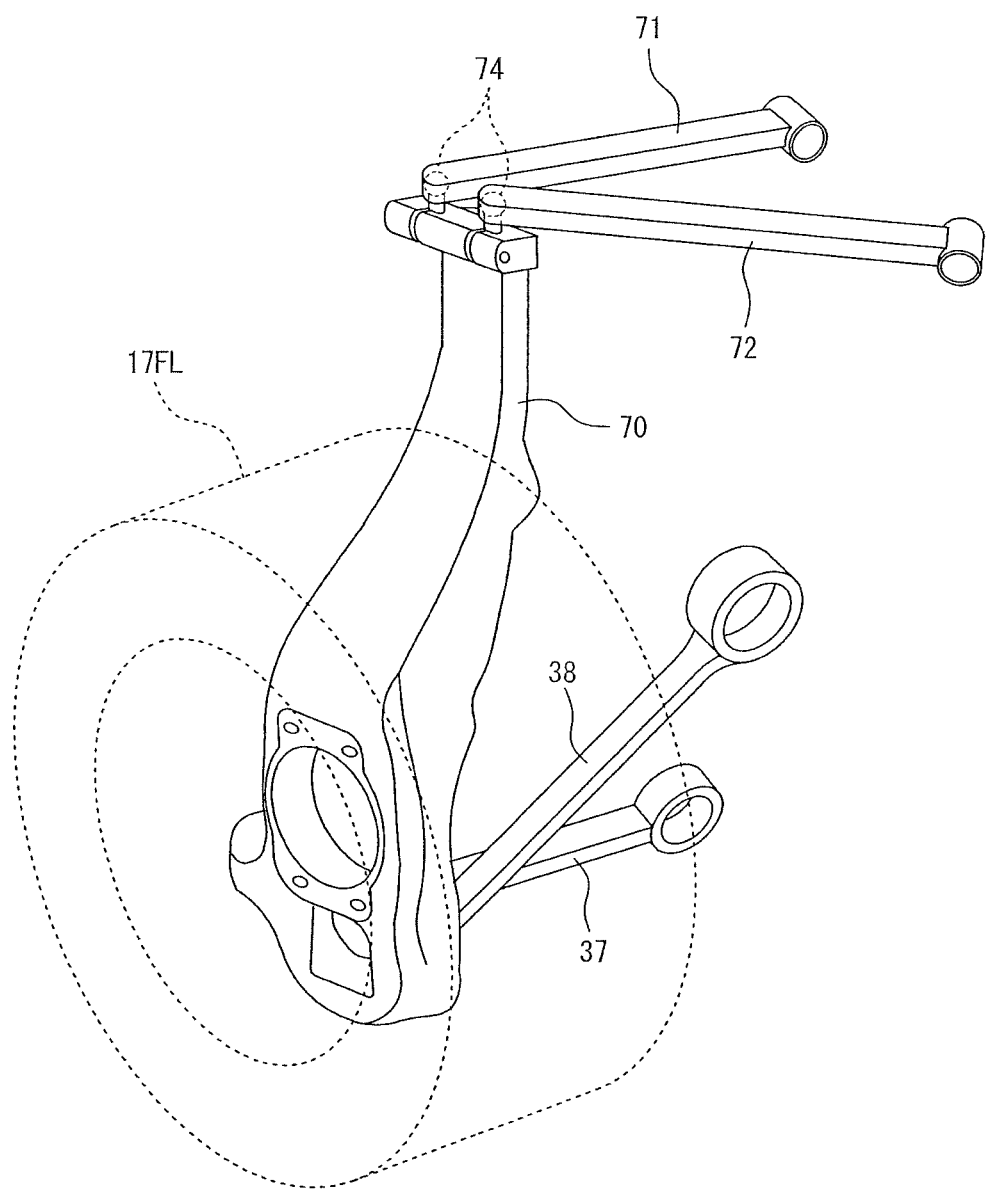
FIG. 21 is a perspective view illustrative of a specific configuration, in a second embodiment of the present disclosure.

In other words, in the second embodiment, as illustrated in FIG. 21, the lower link structure coupled with a lower end of an axle 70a of a knuckle 70 configured to support the turning wheels 17FL and 17FR is configured to be a tension type, in which the transverse link (i.e., the first lower link member) 37 and the tension link (i.e., the second lower link member) 38 cross each other in a similar manner to the above-described first embodiment.

In contrast, the upper link structure coupled with an upper end of the knuckle 70 includes a transverse link (i.e., a transverse link member) 71 as the first upper link arranged to extend in the axle direction, in a planer view, slightly on a rear side of the tire center axis in the vehicle front-rear direction, and a compression link (i.e., a compression link member) 72 as the second upper link arranged on the rear side in the vehicle front-rear direction of the transverse link 71. The transverse link 71 and the compression link 72 themselves do not cross each other, but are configured such that virtual extension lines on the wheel side cross each other. The transverse link 71 and the compression link 72 are each configured with a letter I-shaped arm, and two ball joints 74 supported at upper ends of the knuckle 70 are supported individually.

Figure 23A:
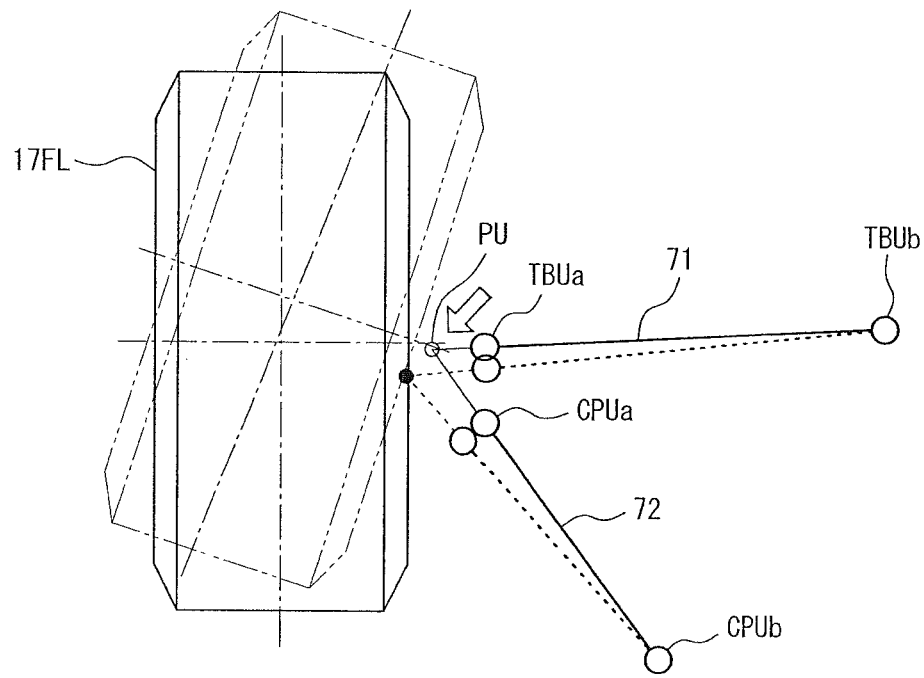
FIG. 23A and FIG. 23B are perspective views illustrative of an upper link structure and a lower link structure, in the second embodiment of the present disclosure.

Herein, as schematically illustrated in FIG. 23A, the transverse link 71 is configured such that a wheel side attachment point TBUa at the upper end of the knuckle 70 is arranged in the inside in the vehicle width direction of the turning wheels 17FL and 17FR and slightly on a rear side of the tire center axis in the vehicle front-rear direction, whereas a vehicle body side attachment point TBUb is arranged in the inside of the vehicle width direction and slightly on a rear side of the tire center axis in the vehicle front-rear direction, in a similar manner.

Also, as schematically illustrated in FIG. 23A, the compression link 72 is configured such that a wheel side attachment point CPUa at the upper end of the knuckle 70 is arranged in the inside in the vehicle width direction of the turning wheels 17FL and 17FR and on the rear side in the vehicle front-rear direction of the wheel side attachment point TBUa of the transverse link 71, whereas a vehicle body side attachment point CPUb is arranged on the rear side in the vehicle front-rear direction of the wheel side attachment point CPUa and in the inside in the vehicle width direction. Thus, the compression link 72 extends from the wheel side attachment point CPUa rearward on a slant.

The upper link structure is different from the upper link structure in the first embodiment in the virtual upper pivot point PU in a planer view, and virtual extension lines on the turning wheel side of the transverse link 71 and the compression link 72 form a cross point. This upper pivot point PU is, as illustrated in FIG. 23A, is arranged slightly in the inside in the vehicle width direction of the turning wheels 17FL and 17FR and slightly on the rear side in the vehicle front-rear direction of the axle center line.

Figure 23B:
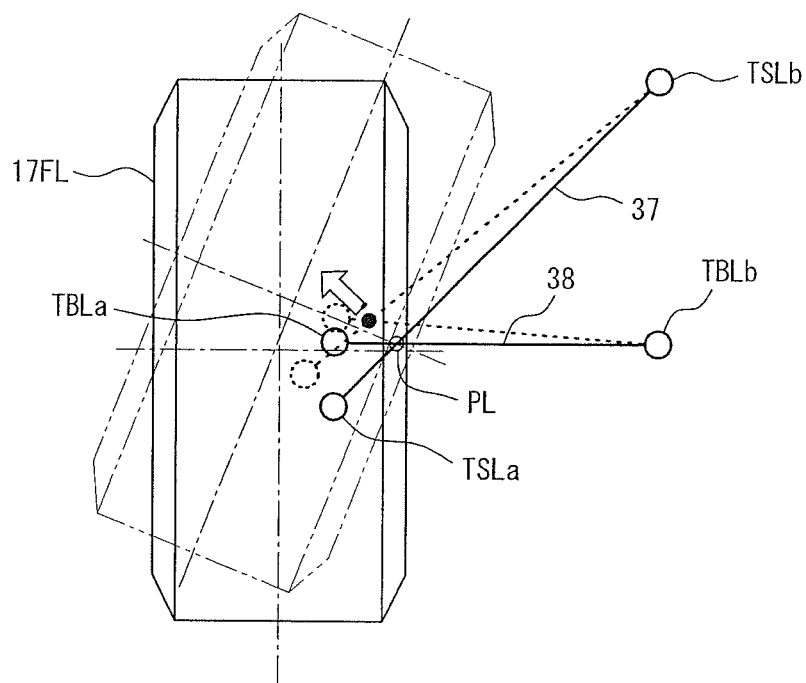

On the other hand, in the lower link structure as illustrated in FIG. 23B, in a similar manner to the above-described first embodiment, the virtual lower pivot point PL is arranged in the vicinity of an inner end part in the vehicle width direction of the turning wheels 17FL and 17FR and slightly on the front side in the vehicle front-rear direction of the axle center line.

Figure 22:
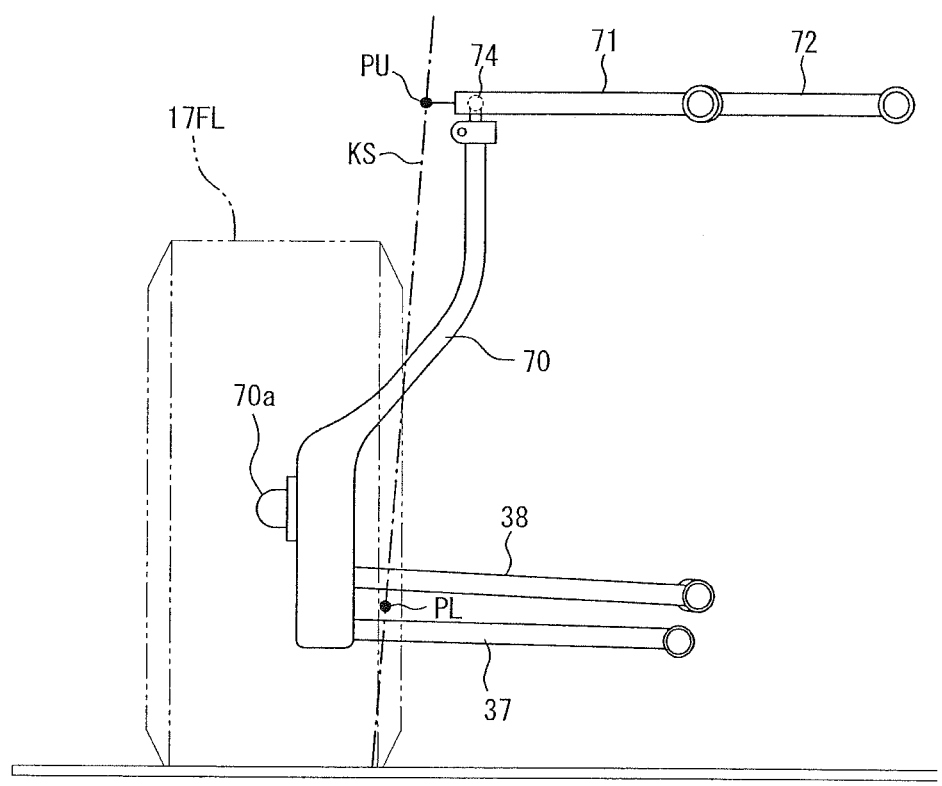
FIG. 22 is a back view illustrative of a specific configuration, in the second embodiment of the present disclosure.

Thus, the kingpin axis KS coupling the virtual upper pivot point PU and the virtual lower pivot point PL is arranged, as illustrated in FIG. 22, such that the road surface grounding point is located on the vehicle front side of the tire grounding surface center point in the tire grounding surface. For this reason, the kingpin slanted angle can be set to equal to or lower than 15 degrees and the caster angle is near zero degrees, so that the moment around the kingpin axis can be made smaller in a similar manner to the above-described first embodiment. Accordingly, the turning can be made with a smaller rack axial force, and the direction of the wheel can be controlled with a smaller force. Thus, the steerability and stability can be improved.

Then, in a case where the turning wheels 17FL and 17RR are turned from the straight travel state, since the lower link structure is configured with the tension type, in a similar manner to the above-described first embodiment, the virtual pivot point PL is moved by the turning obliquely frontward on the outer side in the vehicle width direction and on the front side in the vehicle front-rear direction, as illustrated in FIG. 23B.

On the other hand, in the upper link structure, as illustrated in FIG. 23A, in the straight travel state, the virtual upper pivot point PU is arranged in the vicinity of the axle center axis of the turning wheels 17FL and 17FR, in a planer view, and slightly on the rear side in the vehicle front-rear direction and on the inner side in the vehicle width direction of the turning wheels 17FL and 17FR. When the turning is made for the turning outer wheel from this state, the virtual upper pivot point PU is to move to the outer side in the vehicle width direction and on the rear side in the vehicle front-rear direction.

Accordingly, in consideration of components in the vehicle width direction, a decrease in the scrub radius in the positive scrub domain caused by the virtual lower pivot point PL moving toward the outer side in the vehicle width direction can be suppressed by moving toward the outer side in the width direction of the virtual upper pivot point PU. Simultaneously, an increase in the kingpin slanted angle can be suppressed.

As to the components in the vehicle front-rear direction, the virtual lower pivot point PL moves toward the front side of the vehicle, and the virtual upper pivot point PU moves toward the rear side of the vehicle, then the caster angle is larger in the turning and the caster trail is increased. Thus, in the turning when a high transverse acceleration is generated, it is possible to suppress the over-turning of the turning angle with certainty.

(Advantageous Effect of Second Embodiment)

(1) The upper link structure is configured with two links of the first upper link member and the second upper link member. The upper link structure is configured such that in the turning, the virtual extension lines on the wheel side attachment points of the first upper link members and the second upper link members cross each other, in a planer view, and the upper pivot point represented by such a virtual cross point has a component moving toward the outer side in the vehicle width direction.

With such a configuration, the virtual lower pivot point of the cross point of the first lower link member and the second lower link member crossing each other moves toward the outer side in the vehicle width direction in the turning of the turning wheel. Thus, the scrub radius becomes smaller in the range of positive scrub. In this case, since the virtual upper pivot point of the cross point of the first upper link member and the second upper link member has a component moving toward the outer side in the vehicle width direction, a decrease in the scrub radius can be suppressed.

In this situation, when the moving direction of the virtual upper pivot point is made to conform with the moving direction of the virtual lower pivot point, a change in the kingpin slanted angle is suppressed, in addition to the suppression of decrease in the scrub radius. The rack axial force in the turning of the turning wheel can be maintained small. Further, the component of moving the virtual upper pivot point in the turning toward the rear side in the vehicle front-rear direction is provided, so that the caster angle becomes large and the caster trail is increased. Thus, it is possible to suppress over-turning of the turning angle in the turning of generating a high transverse acceleration, with certainty.

(2) The first upper link member is configured with a transverse link member, whereas the second upper link member is configured with a compression link member.

With such a configuration, the virtual upper pivot point can be moved in the turning toward the outer side in the vehicle width direction and to the rear side in the vehicle front-rear direction. Thus, when the virtual lower pivot point of the cross point of the first lower link member and the second lower link member crossing each other moves toward the outer side in the vehicle width direction and to the front side in the vehicle front-rear direction in the turning of the turning wheel, the virtual upper pivot point of the cross point of the first upper link member and the second upper link member has a component of moving toward the outer side in the vehicle width direction. Thus, a decrease in the scrub radius can be suppressed. In this situation, a change in the kingpin slanted angle can be suppressed, too. Further, the virtual upper pivot point has a component of moving in the turning to the rear side in the vehicle front-rear direction. Hence, the caster angle becomes larger and the caster trail is increased. In the turning that generates a high transverse acceleration, it is possible to suppress the over-turning of the turning angle with certainty.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 automobile
1A vehicle body
1B suspension device
2 steering wheel
3 input side steering axis
4 steering angle sensor
5 steering torque sensor
6 steering reaction force actuator
7 steering reaction force actuator angle sensor
8 turning actuator
9 turning actuator angle sensor
10 output side steering shaft
11 turning torque sensor
12 pinion gear
14 steering rack member
15 tie rod
17FR, 17FL, 17RR, 17RL wheel
21 vehicle state parameter acquisition unit
24FR, 24FL, 24RR, 24RL wheel speed sensor
26 control/drive circuit unit
27 mechanical backup
32 axle
33 axle carrier
34 spring member
37, 39 transverse link (transverse link member)
38, 40 tension link (a tension link member)
41 shock absorber
50 turning controller
51 target turning angle operation unit
52 turning angle controller
53 straight travel performance supplement unit
54 disturbance compensation unit
55 adder
56 delay controller
56a steering start detector
56b monostable circuit
56c gain adjuster
56d multiplier
56e adder
58 turning angle deviation operation unit
59 turning motor controller
60 current deviation operation unit
61 motor current detector
62 motor current controller
63 actuator controller
65 driving force controller
70 knuckle
71 transverse link
72 compression link

The invention claimed is:

1. A vehicle suspension device, comprising:
an axle carrier having an axle of rotatably supporting a turning wheel;
a first lower link member and a second lower link member configured to individually couple a vehicle side support part and the axle carrier, on a lower side of the axle; and
a first upper link member and a second upper link member configured to individually couple the vehicle side support part and the axle carrier, on an upper side of the axle,
wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward in the planer view, when the turning wheel is turned from a straight travel state, and wherein the first upper link member and the second upper forms an upper link structure having a component moving a virtual upper pivot point represented by a cross point of the first upper link member and the second upper link member, in the planer view, at least toward the outer side and frontward in the vehicle width direction, when the turning wheel is turned from the straight travel state.

2. The vehicle suspension device according to claim 1, wherein a kingpin axis of coupling the virtual upper pivot point and the virtual lower pivot point is configured to pass through the inside of a tire grounding surface.

3. The vehicle suspension device according to claim 1, wherein the first lower link member and the second lower link member are configured to cross each other, and to form the lower link structure of a tension link type in which the second lower link member is slanted on the front side of the vehicle with respect to the vehicle width direction.

4. The vehicle suspension device according to claim 3, wherein the first lower link member is configured with a transverse link member, and the second lower link member is configured with a tension link member.

5. The vehicle suspension device according claim 1, wherein the first upper link member and the second upper link member are configured to cross each other, and to form an upper link structure of a tension link type in which the second upper link member is more slanted on the front side of the vehicle than the first upper link member with respect to the vehicle width direction.

6. The vehicle suspension device according to claim 5, wherein the first upper link member is configured with a transverse link, and the second upper link member is configured with a tension link.

7. The vehicle suspension device according to claim 1, wherein the first upper link member and the second upper link member are configured to form an upper link structure of a compression rod type, in which the second upper link member is more slanted on the rear side of the vehicle than the first upper link member with respect to the vehicle width direction and virtual extension lines on a wheel side of the first upper link member and the second upper link cross each other.

8. The vehicle suspension device according to claim 7, wherein the first upper link member is configured with a transverse link, and the second upper link member is configured with a tension link.

9. The vehicle suspension device according to claim 1, wherein the turning wheel is suspended by a steer by wire system in which a displacement of a steering wheel is detected, and a steering rack is displaced by an actuator based on a detection result.

10. An automobile, comprising:
a turning controller configured to control a turning wheel separated from a steering wheel according to a steering state of the steering wheel; and
the suspension device according to claim 2, configured to support the turning wheel to a vehicle body,
wherein the suspension device is configured such that the kingpin axis passes through the tire grounding surface to place importance on a turning response performance more than a straight travel performance,
wherein the turning controller comprises:
a turning actuator configured to turn the turning wheel; and
an actuator controller configured to control the turning actuator so that a turning angle of the turning wheel corresponds to a steering angle of the steering wheel, and
wherein the turning actuator is controlled to supplement a degradation in the straight travel performance caused by placing importance on the turning response performance of the suspension device.

11. The automobile according to claim 10, wherein the turning controller is configured with a steer by wire system.

12. The automobile according to claim 11, wherein the steer by wire system includes a straight travel performance ensuring unit configured to control the turning actuator to supplement the degradation in the straight travel performance by placing importance on the turning response performance of the suspension device.

13. The automobile according to claim 12, wherein the straight travel performance ensuring unit is configured to calculate a self-aligning torque to ensure the straight travel performance of the suspension device.

14. The automobile according to claim 11, wherein when steering of a steering wheel starts from a neutral position, the turning controller includes a turning response performance set unit configured to adjust straight travel performance ensuring control by the straight travel performance ensuring unit and to set initial turning response performance to the turning response performance of the suspension device itself.

15. The automobile according to claim 11, wherein the turning controller includes a turning angle controller configured to estimate compliance steer and correct a displacement of the turning wheel.

16. The automobile according to claim 11,
wherein the turning controller includes a turning response performance set unit configured, when the steering of the steering wheel starts from at least the neutral position, to set a high turning response performance with the turning response performance of the suspension device itself in an initial turning state, and
when a turning state where the initial turning state elapses, to set the turning response performance needed for the straight travel performance ensuring control by the straight travel performance ensuring unit.

17. The automobile according to claim 14, wherein the turning response performance set unit includes a delay controller configured to delay the straight travel performance ensuring control by the straight travel performance ensuring unit, when the steering wheel is steered from the neutral position.

18. The automobile according to claim 17, wherein the delay controller includes a gain adjuster configured to adjust starting of the straight travel performance ensuring control by the straight travel performance ensuring unit.

19. The automobile according to claim 17, wherein the delay controller starts the straight travel performance ensuring control by the straight travel performance ensuring unit, after delaying 0.1 seconds from a steering start timing of the steering to the left or to the right from a state where the steering wheel holds the neutral position.

20. The automobile according to claim 10, wherein the turning controller comprises:
a target turning angle operation unit configured to operate a target turning angle according to the steering angle;
an adder configured to add a straight travel performance ensuring control value of the straight travel performance ensuring unit to the target turning angle operated by the target turning angle operation unit;

a turning motor controller configured to form a motor instruction current to conform an added output from the adder with the turning angle of a turning motor included in the turning actuator; and a motor current controller configured to form a motor drive current conforming with the motor instruction current, to be supplied to the turning motor.

21. A turning control method of a turning wheel supported by a suspension device, the suspension device comprising: an axle carrier having an axle of rotatably supporting a turning wheel; a first lower link member and a second lower link member configured to individually couple a vehicle side support part and the axle carrier, on a lower side of the axle; and a first upper link member and a second upper link member configured to individually couple the vehicle side support part and the axle carrier, on an upper side of the axle, wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward in the planer view, when the turning wheel is turned from a straight travel state, and wherein the first upper link member and the second upper forms an upper link structure having a component moving a virtual upper pivot point represented by a cross point of the first upper link member and the second upper link member, in the planer view, at least toward the outer side and frontward in the vehicle width direction, when the turning wheel is turned from the straight travel state, wherein the suspension device is configured such that a kingpin axis passes through inside of a tire grounding surface at a neutral position of a steering wheel, the turning control method comprising:

turning the turning wheel by to an actuator according to a steering state of the steering wheel; and operating the actuator and applying a restoration force for self-aligning to the turning wheel to ensure straight travel performance of a vehicle.

22. A turning control method of a turning wheel supported by a suspension device, the suspension device comprising: an axle carrier having an axle of rotatably supporting a turning wheel; a first lower link member and a second lower link member configured to individually couple a vehicle side support part and the axle carrier, on a lower side of the axle; and a first upper link member and a second upper link member configured to individually couple the vehicle side support part and the axle carrier, on an upper side of the axle, wherein the first lower link member and the second lower link member is configured to cross each other, and forms a lower link structure to move a virtual lower pivot point represented by a cross point of the first lower link member and the second lower link member, in a planer view, toward an outer side in a vehicle width direction and frontward in the planer view, when the turning wheel is turned from a straight travel state, and wherein the first upper link member and the second upper forms an upper link structure having a component moving a virtual upper pivot point represented by a cross point of the first upper link member and the second upper link member, in the planer view, at least toward the outer side and frontward in the vehicle width direction, when the turning wheel is turned from the straight travel state, wherein the suspension device is configured such that a kingpin axis passes through inside of a tire grounding surface at a neutral position of a steering wheel, the turning control method comprising:

detecting a displacement in the steering angle when the steering wheel is steered;

controlling a turning actuator configured to turn a turning wheel based on a detection result;

controlling a straight travel performance of a vehicle by operating the turning actuator and applying a restoration force for self-aligning onto the turning wheel;

setting a turning response performance of the suspension device itself to an initial turning response performance at an initial turning start period, when the turning starts from a neutral position of the steering wheel; and starting control of ensuring a straight travel performance of the vehicle of the turning actuator after an initial set period elapses.

23. The turning control method according to claim 21, wherein in the control of ensuring the straight travel performance of the vehicle, the self-aligning torque is calculated based on a turning state, and the self-aligning torque calculated is applied to the turning wheel.

24. The turning control method according to claim 22, wherein the initial setting period is set to 0.1 seconds.

* * * * *